US009352848B2

(12) United States Patent
Nikolic et al.

(10) Patent No.: US 9,352,848 B2
(45) Date of Patent: May 31, 2016

(54) FLIGHT DECK TOUCH SCREEN INTERFACE FOR INTERACTIVE DISPLAYS

(71) Applicant: The Boeing Company, Chicago, IL (US)

(72) Inventors: Mark Ivan Nikolic, Seattle, WA (US); Brian David Gilbert, Kenmore, WA (US); Jayson Jean Bowen, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 262 days.

(21) Appl. No.: 14/073,288

(22) Filed: Nov. 6, 2013

(65) Prior Publication Data
US 2015/0123912 A1 May 7, 2015

(51) Int. Cl.
G06F 3/041 (2006.01)
B64D 43/00 (2006.01)
G06F 3/0488 (2013.01)
G08G 5/00 (2006.01)
G01C 23/00 (2006.01)
G06F 3/0481 (2013.01)

(52) U.S. Cl.
CPC ............. *B64D 43/00* (2013.01); *G01C 23/00* (2013.01); *G06F 3/0416* (2013.01); *G06F 3/0481* (2013.01); *G06F 3/04883* (2013.01); *G08G 5/0047* (2013.01); *G06F 2203/04803* (2013.01)

(58) Field of Classification Search
None
See application file for complete search history.

(56) References Cited

U.S. PATENT DOCUMENTS

| 8,159,464 B1 * | 4/2012 | Gribble ............... G06F 3/038 178/18.01 |
| 8,380,366 B1 | 2/2013 | Schulte |
| 2012/0127071 A1 | 5/2012 | Jitkoff et al. |
| 2013/0021265 A1 | 1/2013 | Selim |

FOREIGN PATENT DOCUMENTS

EP 2492789 A1 8/2012

OTHER PUBLICATIONS

International Search Report and Written Opinion, dated Mar. 12, 2015, regarding Application No. PCT/US2014/040619, 11 pages.
"G5000," Garmin Ltd., Product Overview, Part No. 010-G5000-00, copyright 2013, 2 pages, accessed Oct. 30, 2013. https://buy.garmin.com/en-US/US/prod90821.html.
"Pro Line Fusion Integrated Avionics System," Rockwell Collins, Product Brochure No. 147-0761-002, copyright 2013, 8 pages.
Bécouarn, "Final public progress report," ODICIS Consortium, copyright 2012, issue date Sep. 6, 2012, 39 pages.
Pappas et al., "Multi-Touch Cockpit Interface for Controlling Aircraft Systems," U.S. Appl. No. 13/484,029, filed May 30, 2012, 111 pages.
Nikolic et al., "Flight Deck Touch-Sensitive Hardware Controls," U.S. Appl. No. 13/606,082, filed Feb. 7, 2013, 32 pages.
Nikolic et al., "Flight Deck Lighting for Information Display," U.S. Appl. No. 13/761,919, filed Feb. 7, 2013, 35 pages.

* cited by examiner

*Primary Examiner* — Nicholas Lee
(74) *Attorney, Agent, or Firm* — Yee & Associates, P.C.

(57) ABSTRACT

A system and method for controlling a display on an aircraft. An operator interaction with an edge area of a touch screen is identified by a processor unit when a first format of the display is displayed on the touch screen. The edge area extends along an edge of the touch screen. A second format of the display is displayed on the touch screen by the processor unit in response to identifying the operator interaction with the edge area of the touch screen. The second format of the display is different from the first format of the display.

26 Claims, 19 Drawing Sheets

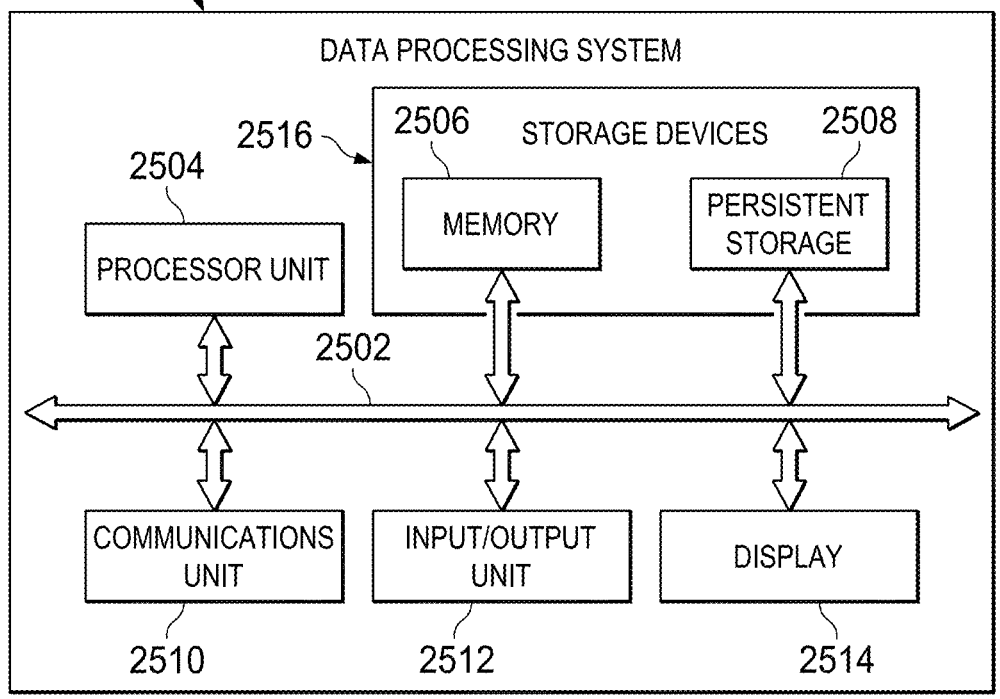
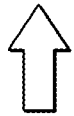
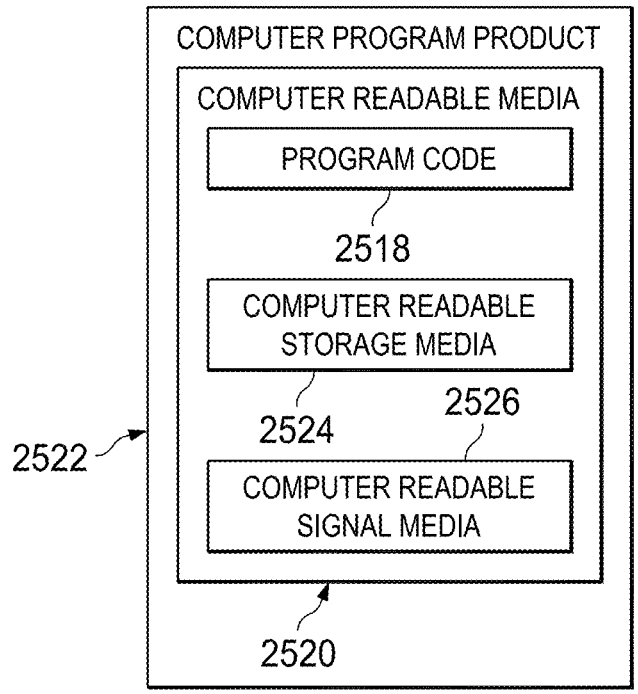
FIG. 25

FLIGHT DECK TOUCH SCREEN INTERFACE FOR INTERACTIVE DISPLAYS

BACKGROUND INFORMATION

1. Field

The present disclosure relates generally to aircraft and in particular to systems and methods for controlling information displayed on the flight deck of an aircraft. Still more particularly, the present disclosure relates to a system and method for controlling various displays on the flight deck of an aircraft via operator interactions with touch screens on the flight deck of the aircraft.

2. Background

A pilot or other operator of an aircraft may use various displays on the flight deck of the aircraft to monitor and control the operation of various aircraft systems. Traditionally, numerous analog devices, such as mechanical gauges and dials, were used to display information on the flight deck of an aircraft. In more modern aircraft, information is provided to the pilot or other operator of the aircraft via digital electronic instrument displays. For example, information for various aircraft systems may be displayed on liquid crystal display devices, cathode ray tube display devices, or other similar display devices on the flight deck of an aircraft. For example, without limitation, such displays may include navigation displays, system displays, communication displays, information displays, flight management displays, checklist displays, other appropriate displays, or various combinations of displays.

A display provided by an engine-indicating and crew-alerting system, EICAS, is a particular example of a display that may be provided on the flight deck of an aircraft. An engine-indicating and crew-alerting system is an integrated system that may be used on aircraft to provide the aircraft crew with instrumentation for the aircraft engines and other systems on the aircraft. An engine-indicating and crew-alerting system typically includes instrumentation for various engine parameters, including, for example, revolutions per minute, temperature values, fuel flow and quantity, oil pressure, and the like. Typical other aircraft systems monitored by an engine-indicating and crew-alerting system are, for example, hydraulic, pneumatic, electrical, deicing, environmental, and control surface systems. While most of the display area on the flight deck of an aircraft may be used for navigation and orientation displays, one display or a section of a display typically is set aside specifically for an engine-indicating and crew-alerting system display.

Several display formats may be displayed on a multi-function display on the flight deck of an aircraft. A multi-function display may be used to display information to the operator of an aircraft in numerous configurable ways. For example, without limitation, a multi-function display may be configured to display a navigation route, moving map, weather information, airport information, other information, or various combinations of information all on the same display screen.

The display of information on the flight deck of an aircraft may be driven by a flight management system, other systems, or various combinations of systems on the aircraft. A flight management system is a specialized computer system that automates a wide variety of in-flight tasks, thereby reducing the workload of the aircraft flight crew.

The information displayed on the flight deck of an aircraft may be controlled to display flight information as needed. The ability to control the information displayed on the flight deck of an aircraft may simplify aircraft operation and navigation and may allow the aircraft operator to focus on the most pertinent information.

Currently, a pilot or other operator of an aircraft may control and interact with displays on the flight deck of the aircraft using various buttons, knobs, or other mechanical devices that may be provided near the various display devices on the flight deck. For example, a multi-function display on the flight deck of an aircraft may include a display screen surrounded by mechanical buttons that can be used to control the information that is displayed on the multi-function display.

Current systems and methods for displaying information on the flight deck of an aircraft may limit the ability of a pilot or other operator of the aircraft to control and interact with the information displayed. Current systems and methods for displaying information on the flight deck of an aircraft also may limit the ability to improve the display of information on the flight deck of an aircraft. Therefore, it would be desirable to have a method and apparatus that take into account at least some of the issues discussed above, as well as other possible issues.

SUMMARY

The illustrative embodiments of the present disclosure provide a method of controlling a display on an aircraft. An operator interaction with an edge area of a touch screen is identified by a processor unit when a first format of the display is displayed on the touch screen. The edge area extends along an edge of the touch screen. A second format of the display is displayed on the touch screen by the processor unit in response to identifying the operator interaction with the edge area of the touch screen. The second format of the display is different from the first format of the display.

The illustrative embodiments of the present disclosure also provide an apparatus comprising a touch screen on a flight deck on an aircraft and a controller. The controller is configured to identify an operator interaction with an edge area of the touch screen when a first format of a display is displayed on the touch screen. The edge area extends along an edge of the touch screen. The controller is further configured to display a second format of the display on the touch screen in response to identifying the operator interaction with the edge area of the touch screen. The second format of the display is different from the first format of the display.

The illustrative embodiments of the present disclosure also provide another method of controlling a display on an aircraft. A navigation display is displayed by a processor unit on a touch screen on the aircraft. An operator interaction with the navigation display displayed on the touch screen is identified by the processor unit. The navigation display is changed by the processor unit in response to the operator interaction with the navigation display.

The illustrative embodiments of the present disclosure also provide another apparatus comprising a touch screen on a flight deck on an aircraft and a controller. The controller is configured to display a navigation display on the touch screen, identify an operator interaction with the navigation display displayed on the touch screen, and change the navigation display in response to the operator interaction with the navigation display.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 25 is an illustration of a block diagram of a data processing system in accordance with an illustrative embodiment.

DETAILED DESCRIPTION

Figure 1:
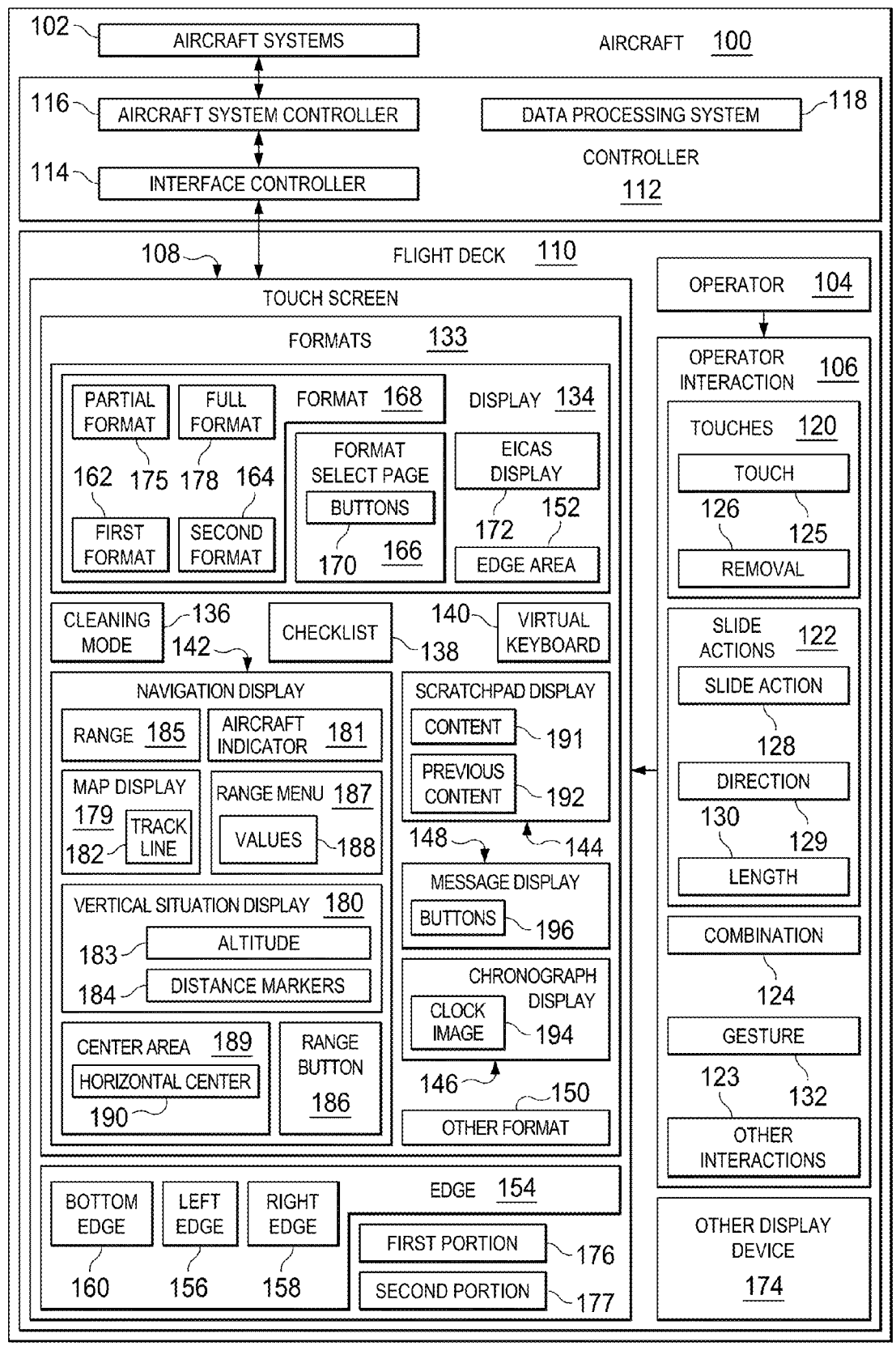
FIG. 1 is an illustration of a block diagram of a flight deck touch screen interface for an aircraft in accordance with an illustrative embodiment.

The different illustrative embodiments recognize and take into account a number of different considerations. "A number of", as used herein with reference to items, means one or more items. For example, "a number of different considerations" means one or more different considerations.

The different illustrative embodiments recognize and take into account that, currently, operator interaction with the displays on the flight deck of an aircraft is achieved via hardware cursor control devices. For example, the operator of an aircraft may control and interact with information displayed on the flight deck of the aircraft using various mechanical devices, such as buttons and knobs. Such hardware control devices may be expensive, add weight to the aircraft, take up space on the flight deck, and provide only indirect control of the displays.

The different illustrative embodiments also recognize and take into account that current displays on the flight deck of an aircraft may give the appearance that they can be interacted with by touch. However, current display hardware does not support touch interaction. The different illustrative embodiments recognize and take into account that the current use of mechanical devices to interact with information displayed on the flight deck of an aircraft may not be intuitive and may lead to user frustration.

The different illustrative embodiments also recognize and take into account that current flight deck display systems that use mechanical devices for user interaction with aircraft displays may be difficult and expensive to change. The ability to increase or otherwise change the functionality provided by an existing group of mechanical display interfaces may be limited. In this case, improvements in display capabilities may not be possible or may require relatively expensive and time consuming hardware changes on the flight deck. In some cases, there may be insufficient space available on the flight deck for additional mechanical devices to provide for additional operator interaction with the aircraft displays.

The illustrative embodiments provide a system and method for controlling and interacting with displays on the flight deck of an aircraft that does not rely on mechanical interface devices. In accordance with an illustrative embodiment, various displays may be provided on a number of touch screens on the flight deck of an aircraft. An operator of the aircraft may control and interact with the various displays by intuitive and user friendly operator interactions with the touch screens.

For example, in accordance with an illustrative embodiment, displays on the flight deck of an aircraft may be controlled by operator interactions with the displays along the edge of a touch screen. In another example, displays on the flight deck of an aircraft may be controlled by combinations of operator interactions with a touch screen to form recognizable gestures. Various operator interactions with a touch screen may be used to change how information is presented on a flight deck display in accordance with an illustrative embodiment. Operator interactions with a touch screen also may be used to add or remove content from a flight deck display in accordance with an illustrative embodiment. Other operator interactions with a touch screen may be used to control various functions displayed on a flight deck display in accordance with an illustrative embodiment.

The illustrative embodiments may adapt current displays on the flight deck of an aircraft to take advantage of touch screen interaction. The illustrative embodiments also may solve the problem of integrating touch-based features with already existing designs for controlling or otherwise interacting with flight deck displays.

The illustrative embodiments allow for the reduction of cursor control hardware and other hardware controls for controlling and interacting with the displays on an aircraft. Allowing for the removal of hardware display controls from an aircraft may reduce the weight and cost of the aircraft and may increase the space available on the flight deck. The illustrative embodiments also may reduce the cost and installation time for adding functionality to the displays on the flight deck of an aircraft and may make such improvements possible or practical in some cases.

Turning to FIG. 1, an illustration of a block diagram of a flight deck touch screen interface for an aircraft is depicted in accordance with an illustrative embodiment. Aircraft 100 may be a commercial passenger aircraft, a cargo aircraft, or any other type of aircraft.

Aircraft 100 may include various aircraft systems 102. For example, without limitation, aircraft systems 102 may include communication systems, flight management systems, aircraft control systems, navigation systems, surveillance systems, other appropriate systems, or combinations of systems for performing various functions on aircraft 100.

Operator 104 may monitor the operation of aircraft systems 102, control the operation of aircraft systems 102, or both monitor and control the operation of aircraft systems 102 by operator interaction 106 with touch screen 108. Operator 104 may be a member of the flight crew for aircraft 100. For example, without limitation, operator 104 may be a pilot, co-pilot, or other member of the flight crew for aircraft 100.

Touch screen 108 may be implemented using any appropriate touch screen device. Either a single touch screen device or multiple touch screen devices may be used to implement touch screen 108.

Touch screen 108 may be located on flight deck 110 of aircraft 100. Flight deck 110 also may be referred to as the cockpit of aircraft 100. Touch screen 108 may be located at any appropriate number of positions on flight deck 110.

Controller 112 may be configured to display information for aircraft systems 102 on touch screen 108, to identify operator interaction 106 with touch screen 108, to control the display of information on touch screen 108 in response to operator interaction 106 with touch screen 108, and to control operation of aircraft systems 102 in response to operator interaction 106 with touch screen 108. Controller 112 may include interface controller 114 and aircraft system controller 116.

Interface controller 114 may be configured to control the display of information on touch screen 108. Interface controller 114 also may be configured to identify operator interaction 106 with the displays on touch screen 108. Interface controller 114 may be configured to control the displays on touch screen 108 in response to operator interaction 106 with touch screen 108.

Aircraft system controller 116 may be configured to provide information from aircraft systems 102 to interface controller 114 for display on touch screen 108. Aircraft system controller 116 also may be configured to control operation of aircraft systems 102 in response to operator interaction 106 with the displays on touch screen 108, as identified by interface controller 114. For example, without limitation, aircraft system controller 116 may generate appropriate control signals for controlling aircraft systems 102 in response to operator interaction 106 with the displays on touch screen 108, as identified by interface controller 114.

The various functions performed by controller 112 may be implemented in appropriate hardware or in software in combination with appropriate hardware. For example, the various functions performed by controller 112 may be implemented in data processing system 118. Data processing system 118 may include a number of data processing devices that may be located at a number of locations on aircraft 100. For example, without limitation, data processing system 118 may be located on flight deck 110 of aircraft 100. For example, without limitation, functions performed by controller 112 may be implemented in data processing system 118 that is part of aircraft systems 102, touch screen 108, or both.

Operator interaction 106 with touch screen 108 may include, for example, without limitation, touches 120, slide actions 122, other interactions 123, or any appropriate combination 124 of touches 120, slide actions 122 and other interactions 123. Operator 104 may perform touches 120 by touching touch screen 108 using a finger, a stylus, a pen, or any other appropriate tool or device. Touches 120 may occur when operator 104 touches touch screen 108 for at least a selected duration. Touches 120 may include touch 125 and removal 126 of touch 125. Touches 120 may be defined by a location on touch screen 108 where touch 125 occurs and the duration of touch 125. The duration of touch 125 is the time between touch 125 and removal 126 of touch 125. For example, touches 120 may include a tap on touch screen 108.

Slide actions 122 occur when operator 104 touches touch screen 108 and then moves the touch along touch screen 108 for a selected distance. Slide actions 122 may be referred to as drag actions, swipe actions, or using other appropriate terms. Slide actions 122 may be defined by the location of slide action 128 on touch screen 108, direction 129 of movement of slide action 128 along touch screen 108, and length 130 of slide action 128. For example, length 130 of slide action 128 may be the distance of movement along touch screen 108 between touch 125 and removal 126 of touch 125, between touch 125 and a change in direction 129 of slide action 128, between changes in direction 129 of consecutive slide actions 122, or between a change in direction 129 of slide action 128 and removal 126 of touch 125.

Operator 104 may form gesture 132 on touch screen 108 by any appropriate combination 124 of touches 120, slide actions 122, and other interactions 123 performed simultaneously, in sequence, or both. For example, gesture 132 may comprise a recognizable shape or pattern formed on touch screen 108 by any appropriate combination 124 of touches 120, slide actions 122, and other interactions 123.

Information may be displayed on touch screen 108 in a variety of different formats 133. Different formats 133 may be used to display different information, such as information from different aircraft systems 102, or to display information in different ways on touch screen 108. For example, without limitation, formats 133 that may be displayed on touch screen 108 may include display 134, display for cleaning mode 136, checklist 138, virtual keyboard 140, navigation display 142, scratchpad display 144, chronograph display 146, message display 148, and other format 150. More, fewer, or different formats from those described by example herein may be displayed on a touch screen on the flight deck of an aircraft in accordance with an illustrative embodiment.

Display 134 may be a multi-function display or any other appropriate display on aircraft 100. For example, without limitation, display 134 may include a number of formats 133 for displaying information for various functions on aircraft 100. In accordance with an illustrative embodiment, operator 104 may control formats 133 that are displayed on display 134 by operator interaction 106 with edge area 152 of touch screen 108.

Edge area 152 is an area extending along edge 154 of touch screen 108. For example, without limitation, edge area 152 may be positioned adjacent to one or more of left edge 156, right edge 158, and bottom edge 160 of touch screen 108. Edge area 152 may extend along the entire length of edge 154 of touch screen 108 or along any appropriate portion of the length of edge 154 of touch screen 108. In any case, edge area 152 extends less than half way across touch screen 108 in the direction perpendicular to edge 154 of touch screen 108 along which the longest dimension of edge area 152 extends. For example, without limitation, edge area 152 may extend approximately one inch from edge 154 of touch screen 108 in the direction perpendicular to edge 154 of touch screen 108 along which the longest dimension of edge area 152 extends.

Controller 112 may be configured to identify operator interaction 106 with edge area 152 of touch screen 108 when first format 162 of display 134 is displayed on touch screen 108. Controller 112 may be configured to display second format 164 of display 134 on touch screen 108 in response to identifying operator interaction 106 with edge area 152 of touch screen 108 when first format 162 is displayed on touch screen 108.

For example, format select page 166 is an example of one format 168 of display 134. Format select page 166 may be configured to allow operator 104 to select which format 168 from number of formats 133 to display on touch screen 108. For example, format select page 166 may include a number of buttons 170 corresponding to a number of formats 133 that may be displayed on touch screen 108. For example, without limitation, buttons 170 may include thumb nail images of formats 133 that may be displayed on touch screen 108. Operator 104 may select format 168 to be displayed on touch screen 108 by appropriate operator interaction 106 with one of buttons 170 on format select page 166 when format select page 166 is displayed on touch screen 108.

Format select page 166 may be displayed on touch screen 108 in response to operator interaction 106 with edge area 152 of touch screen 108 when any format 168 other than format select page 166 is displayed on touch screen 108. For example, without limitation, format select page 166 may be displayed on touch screen 108 in response to slide action 128 by operator 104 in edge area 152 on left edge 156 or right edge 158 of touch screen 108.

Engine-indicating and crew-alerting system, EICAS, display 172 is another example of format 168 that may be displayed on display 134. It may be desirable that the important information displayed in EICAS display 172 is displayed somewhere on flight deck 110 at all times. Therefore, in the case where first format 162 displayed on display 134 is EICAS display 172, EICAS display 172 may automatically be displayed on other display device 174 on flight deck 110 in response to operator interaction 106 with edge area 152 of touch screen 108 that causes second format 164, such as format select page 166, to be displayed on touch screen 108 in place of EICAS display 172. Automatically moving EICAS display 172 to other display device 174 in this manner assures that the important information displayed in EICAS display 172 remains displayed somewhere on flight deck 110 when EICAS display 172 is replaced by another format 168 in response to operator interaction 106 with edge area 152 of touch screen 108. Other display device 174 may be a touch screen or another type of display device on flight deck 110.

Operator interaction 106 with edge area 152 of touch screen 108 may be used to move format 168 displayed on touch screen 108 to other display device 174 on flight deck 110. For example, without limitation, format 168 displayed on touch screen 108 may be displayed on other display device 174 to the left of touch screen 108 on flight deck 110, or at another location on flight deck 110, in response to slide action 128 by operator 104 to the left in edge area 152 along bottom edge 160 of touch screen 108. Similarly, format 168 displayed on touch screen 108 may be displayed on other display device 174 to the right of touch screen 108 on flight deck 110, or at another location on flight deck 110, in response to slide action 128 by operator 104 to the right in edge area 152 along bottom edge 160 of touch screen 108.

Second format 164 may be displayed on touch screen 108 in place of or along with first format 162 in response to operator interaction 106 with edge area 152 of touch screen 108. For example, without limitation, format 168 displayed on touch screen 108 may comprise partial format 175 when first format 162 is displayed in first portion 176 of touch screen 108 while second format 164 is displayed in second portion 177 of touch screen 108. Format 168 may comprise full format 178 when only one format 168 is displayed on touch screen 108.

Operator interaction with edge area 152 of touch screen 108 may be used to change format 168 displayed on touch screen 108 from partial format 175 to full format 178, and vice versa. For example, without limitation, partial format 175 may include first format 162 displayed on the left side of touch screen 108 while second format 164 is displayed on the right side of touch screen 108. In this case, format 168 displayed on touch screen 108 may be changed from partial format 175 to full format 178 display of first format 162 on touch screen 108 in response to slide action 128 by operator 104 to the right in edge area 152 along bottom edge 160 of the left side of touch screen 108. Format 168 displayed on touch screen 108 may be changed from partial format 175 to full format 178 display of second format 164 on touch screen 108 in response to slide action 128 by operator 104 to the left in edge area 152 along bottom edge 160 of the right side of touch screen 108.

Format 168 displayed on touch screen 108 may be changed from full format 178 to partial format 175 in response to slide action 128 by operator 104 to the left or to the right in edge area 152 along bottom edge 160 of touch screen 108. For example, full format 178 may be displayed as partial format 175 on the left side of touch screen 108 in response to slide action 128 by operator 104 to the left in edge area 152 along bottom edge 160 of touch screen 108. Full format 178 may be displayed as partial format 175 on the right side of touch screen 108 in response to slide action 128 by operator 104 to the right in edge area 152 along bottom edge 160 of touch screen 108.

Specific ones of formats 133 may be displayed on touch screen 108 in response to operator interaction 106 with touch screen 108 to form gesture 132. For example, without limitation, cleaning mode 136 for touch screen 108 may be activated in response to gesture 132 comprising multiple back and forth slide actions 122 on touch screen 108. An appropriate display for cleaning mode 136 may be displayed on touch screen 108 when cleaning mode 136 is active. Operator interaction 106 with touch screen 108 may not have any effects when touch screen 108 is in cleaning mode 136. Checklist 138 may be displayed on touch screen 108 in response to gesture 132 comprising two slide actions 122 forming the shape of a check mark on touch screen 108. Virtual keyboard 140 may be displayed on touch screen 108 in response to gesture 132 comprising five simultaneous touches 120 on touch screen 108. Other format 150 may be displayed on touch screen 108 in response to another appropriate gesture 132.

Navigation display 142 may be configured to display navigational information on touch screen 108. For example, without limitation, navigation display 142 may include information indicating the current position and route plan for aircraft 100. Navigation display 142 may include map display 179 and vertical situation display 180. Map display 179 may include aircraft indicator 181 indicating the current position of aircraft 100 and track line 182 indicating the direction of travel for aircraft 100. Vertical situation display 180 may include aircraft indicator 181 and a representation of altitude 183 of aircraft 100 with reference to distance markers 184.

The display of information in navigation display 142 may be changed in response to operator interaction 106 with navigation display 142 displayed on touch screen 108. For example, range 185 of navigation display 142 may be changed in response to operator interaction with navigation display 142 displayed on touch screen 108. Range 185 of navigation display 142 may refer to the distance from the current position of aircraft 100 that is displayed in navigation display 142.

For example, without limitation, range 185 of navigation display 142 may be changed in response to slide action 128 by operator 104 along track line 182 in map display 179. Alternatively, or in addition, range 185 of navigation display 142 may be changed in response to slide action 128 by operator 104 along distance markers 184 in vertical situation display 180. Range 185 of navigation display 142 may be changed by an amount corresponding to length 130 of slide action 128 along track line 182 or distance markers 184. Range 185 of navigation display 142 may be increased or decreased based on the direction of slide action 128 along track line 182 or distance markers 184.

Alternatively, or in addition, navigation display 142 may include range button 186. Range menu 187 may be displayed on touch screen 108 in response to operator interaction 106 with range button 186. Range menu 187 may include indications for a number of values 188 for range 185 of navigation display 142. Range 185 of navigation display 142 may be changed to one of values 188 in response to operator interaction 106 with the indication of the one of values 188 in range menu 187.

The display of vertical situation display 180 in navigation display 142 may be controlled by operator interaction 106 with navigation display 142 displayed on touch screen 108. For example, without limitation, vertical situation display 180 may be displayed at the bottom of navigation display 142 in response to slide action 128 by operator 104 in an upward direction in center area 189 of navigation display 142. Vertical situation display 180 may cease to be displayed on navigation display 142 in response to slide action 128 by operator 104 in a downward direction in center area 189 of navigation display 142. For example, without limitation, center area 189 may be located at horizontal center 190 of navigation display 142 and adjacent to bottom edge 160 of touch screen 108.

Scratchpad display 144 may be used, for example, to enter information into a flight management computer or for other appropriate purposes on aircraft 100. For example, operator 104 may enter appropriate content 191 in scratchpad display 144. Content 191 in scratchpad display 144 may be sent by operator 104 to the flight management computer or another location on aircraft 100 after operator 104 confirms that content 191 in scratchpad display 144 is correct.

Content 191 in scratchpad display 144 may be controlled by operator interaction 106 with scratchpad display 144 displayed on touch screen 108. For example, without limitation, content 191 in scratchpad display 144 may be removed in response to slide action 128 by operator 104 to the left across scratchpad display 144. Previous content 192 of scratchpad display 144 may be added back into content 191 of scratchpad display 144 in response to slide action 128 by operator 104 to the right across scratchpad display 144. Previous content 192 may include the most recent content 191 of scratchpad display 144 to be removed from scratchpad display 144.

Chronograph display 146 may be configured for displaying and controlling a chronograph or timer on aircraft 100. The chronograph or timer may be controlled by operator interaction 106 with chronograph display 146 displayed on touch screen 108. For example, chronograph display 146 may include clock image 194. For example, without limitation, clock image 194 may include an image of an analog clock face. Operator interaction 106 with clock image 194 in chronograph display 146 may be used to start, stop, and deactivate the chronograph displayed in chronograph display 146. For example, without limitation, the chronograph displayed in chronograph display 146 may start, stop, and be deactivated in response to consecutive touches 120 by operator 104 on clock image 194 in chronograph display 146.

Message display 148 may be configured to display messages received by aircraft 100. For example, without limitation, message display 148 may be configured to display data link messages or other messages received by aircraft 100. Data link messages may include messages received by aircraft 100 from air traffic controllers. Messages received by aircraft 100 may be handled by operator interaction 106 with message display 148 displayed on touch screen 108. For example, message display 148 may comprise buttons 196 for accepting, rejecting, and canceling messages received by aircraft 100. Messages received by aircraft 100 may be accepted, rejected, and canceled in response to operator interaction 106 with buttons 196 on message display 148 displayed on touch screen 108.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
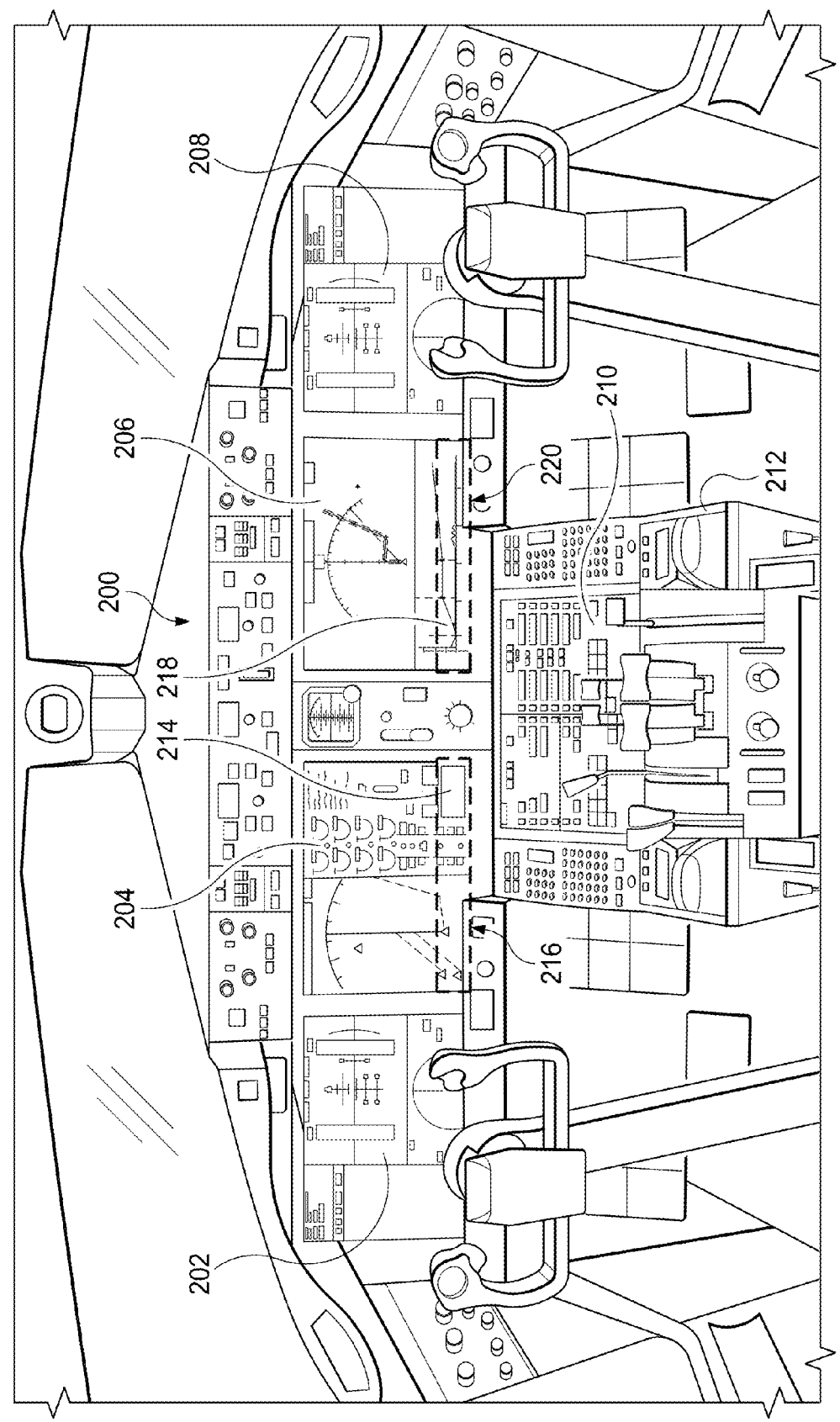
FIG. 2 is an illustration of touch screens on the flight deck of an aircraft in accordance with an illustrative embodiment.

Turning to FIG. 2, an illustration of touch screens on the flight deck of an aircraft is depicted in accordance with an illustrative embodiment. Flight deck 200 may be an example of one implementation of flight deck 110 on aircraft 100 in FIG. 1. Touch screens 202, 204, 206, 208, and 210 may be examples of touch screen 108 in FIG. 1.

Touch screens 202, 204, 206, 208, and 210 may be positioned on flight deck 200 at any appropriate locations within reach of a pilot or other operator of the aircraft. For example, without limitation, touch screens 202, 204, 206, and 208 may be located in front of a pilot or other operator of the aircraft. Touch screen 210 may be located on pedestal 212 or on another appropriate structure to the side of the pilot or other operator of the aircraft.

Various different formats may be displayed on touch screens 202, 204, 206, 208, and 210. A format displayed on one of touch screens 202, 204, 206, 208, and 210 may be moved and displayed on another one of touch screens 202, 204, 206, 208, and 210 by operator interaction with touch screens 202, 204, 206, 208, and 210. For example, without limitation, a format displayed on touch screen 204 may be moved and displayed on touch screen 206 to the right of touch screen 204 in response to a slide action by the operator to the right in edge area 214 along bottom edge 216 of touch screen 204. A format displayed on touch screen 206 may be moved and displayed on touch screen 204 to the left of touch screen 206 in response to a slide action by the operator to the left in edge area 218 along bottom edge 220 of touch screen 206.

Figure 3:
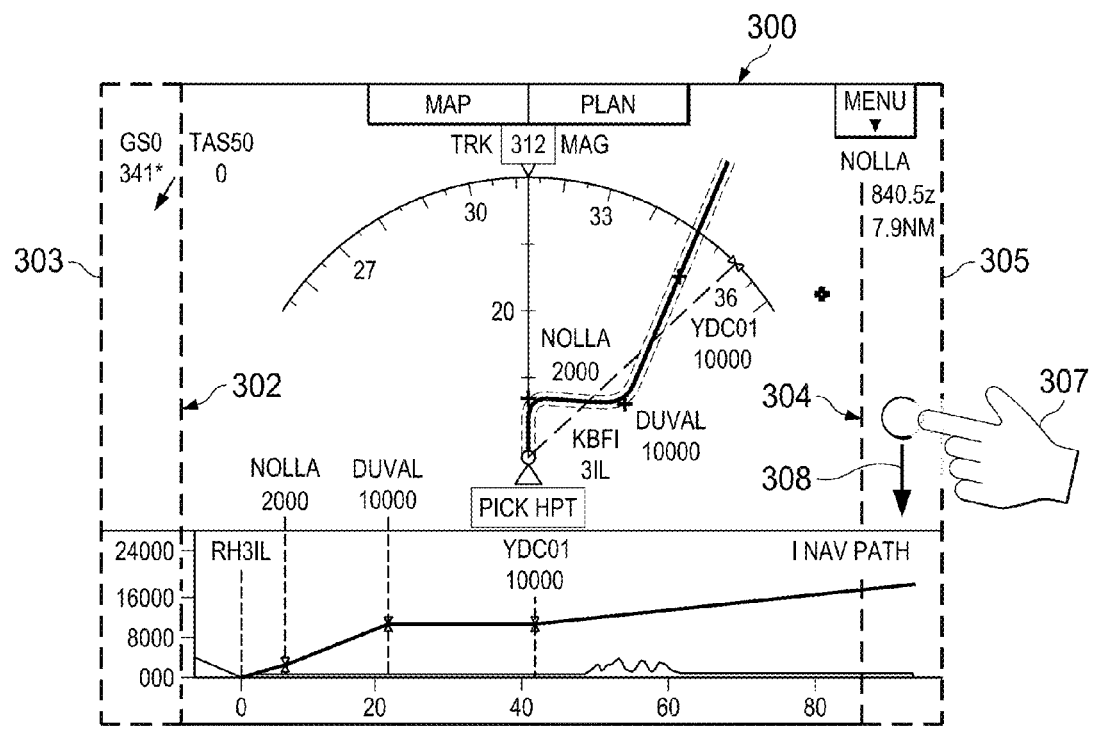
FIG. 3 is an illustration of a display comprising edge areas for controlling a format of the display in accordance with an illustrative embodiment.

Turning to FIG. 3, an illustration of a display comprising edge areas for controlling the format of the display is depicted in accordance with an illustrative embodiment. Display 300 may be an example of one implementation of display 134 on touch screen 108 in FIG. 1.

In this example, edge area 302 is provided along left edge 303 of display 300. Edge area 302 extends along the entire length of edge 303 of display 300. Edge area 304 is provided along right edge 305 of display 300. Edge area 304 extends along the entire length of right edge 305 of display 300.

The format of display 300 may be changed in response to operator interaction with edge area 302 or edge area 304. For example, in this case a navigation display is displayed on display 300. Another format, such as a format select page, may be displayed on display 300 in response to slide action 307 by an operator in edge area 304 downward, in the direction of arrow 308.

Figure 4:
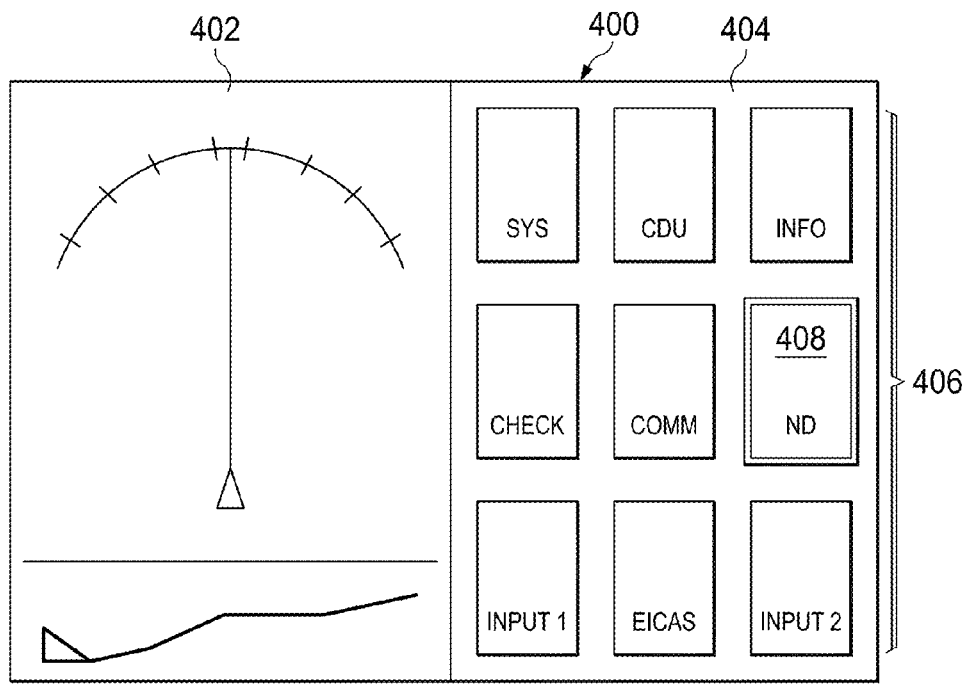
FIG. 4 is an illustration of a display comprising two different formats displayed simultaneously in accordance with an illustrative embodiment.

Turning to FIG. 4, an illustration of a display comprising two different formats displayed simultaneously is depicted in accordance with an illustrative embodiment. Display 400 may be an example of partial format 175 for display 134 on touch screen 108 in FIG. 1. Display 400 may be an example of display 300 after operator interaction of slide action 307 with edge area 304 in FIG. 3.

In this example, navigation display 402 is displayed on one side of display 400 and format select page 404 is displayed at the same time on the other side of display 400. Format select page 404 includes a number of buttons 406 corresponding to various different formats that may be displayed on display 400. For example, without limitation, buttons 406 may include thumb nail images of corresponding formats that may be displayed on display 400. An operator may select a format to be displayed on display 400 by appropriate operator interaction with one of buttons 406.

Format select page 404 may be displayed on display 400 in response to an operator interaction with an edge area of display 400 when any format other than format select page 404 is displayed on display 400. One of buttons 406 corresponding to the format that was displayed on display 400 when operator interaction with the edge area of display 400 caused format select page 404 to be displayed may be highlighted in any appropriate manner. In this example, format select page 404 is displayed on display 400 in response to an operator interaction with an edge area of display 400 when navigation display 402 is displayed on display 400. Therefore, in this case, button 408 corresponding to navigation display 402 is highlighted in format select page 404.

Figure 5:
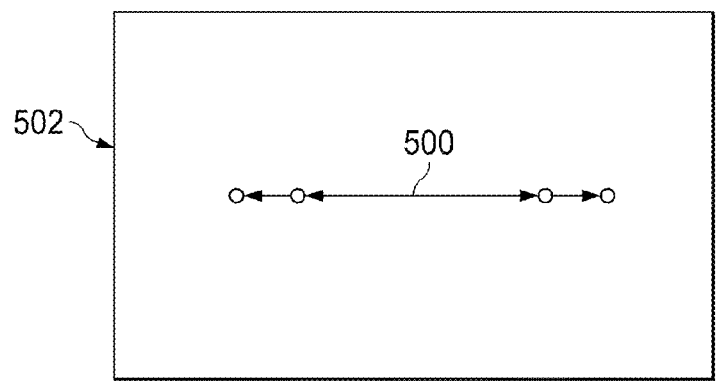
FIG. 5 is an illustration of a gesture for a cleaning mode of a display in accordance with an illustrative embodiment.

Turning to FIG. 5, an illustration of a gesture for a cleaning mode of a display is depicted in accordance with an illustrative embodiment. Gesture 500 may be an example of one implementation of gesture 132 by operator 104 on touch screen 108 in FIG. 1.

Gesture 500 comprises a plurality of back and forth slide actions by an operator on a touch screen 502. A cleaning mode for touch screen 502 may be entered and a display for the cleaning mode may be displayed on touch screen 502 in response to gesture 500 by the operator on touch screen 502.

Figure 6:
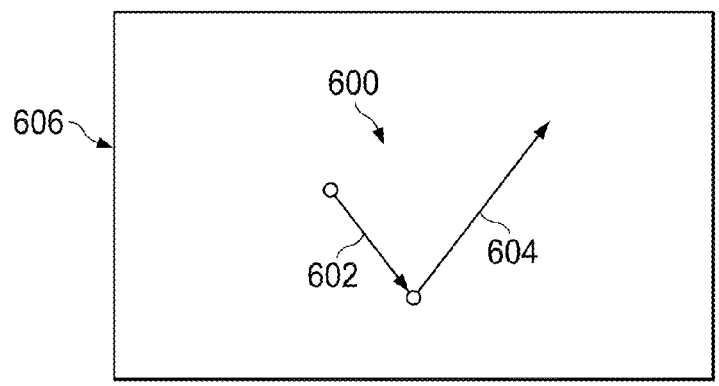
FIG. 6 is an illustration of a gesture for displaying a checklist in accordance with an illustrative embodiment.

Turning to FIG. 6, an illustration of a gesture for displaying a checklist is depicted in accordance with an illustrative embodiment. In this example, gesture 600 may be an example of one implementation of gesture 132 by operator 104 on touch screen 108 in FIG. 1.

Gesture 600 comprises first slide action 602 followed by second slide action 604 on touch screen 606. First slide action 602 and second slide action 604 together form gesture 600 in the shape of a check mark on touch screen 606. A checklist display may be displayed on touch screen 606 in response to gesture 600 by an operator on touch screen 606.

Figure 7:
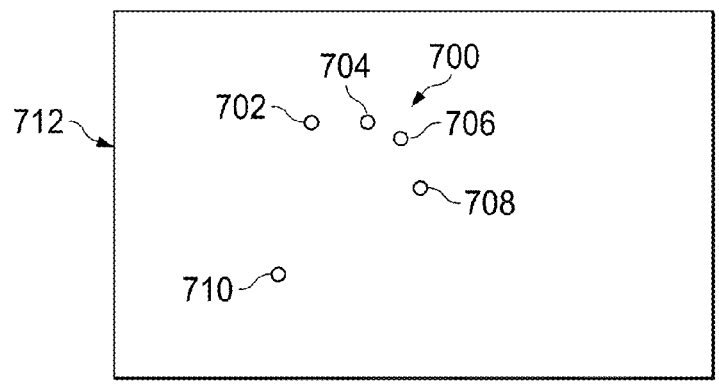
FIG. 7 is an illustration of a gesture for displaying a virtual keyboard in accordance with an illustrative embodiment.

Turning to FIG. 7, an illustration of a gesture for displaying a virtual keyboard is depicted in accordance with an illustrative embodiment. In this example, gesture 700 may be an example of one implementation of gesture 132 by operator 104 on touch screen 108 in FIG. 1.

Gesture 700 may include five simultaneous touches 702, 704, 706, 708, and 710 by an operator on touch screen 712. For example, without limitation, five simultaneous touches 702, 704, 706, 708, and 710 may be provided by the five fingers on one hand of the operator touching touch screen 712 at the same time. A virtual keyboard may be displayed on touch screen 712 in response to gesture 700 by an operator on touch screen 712.

Figure 8:
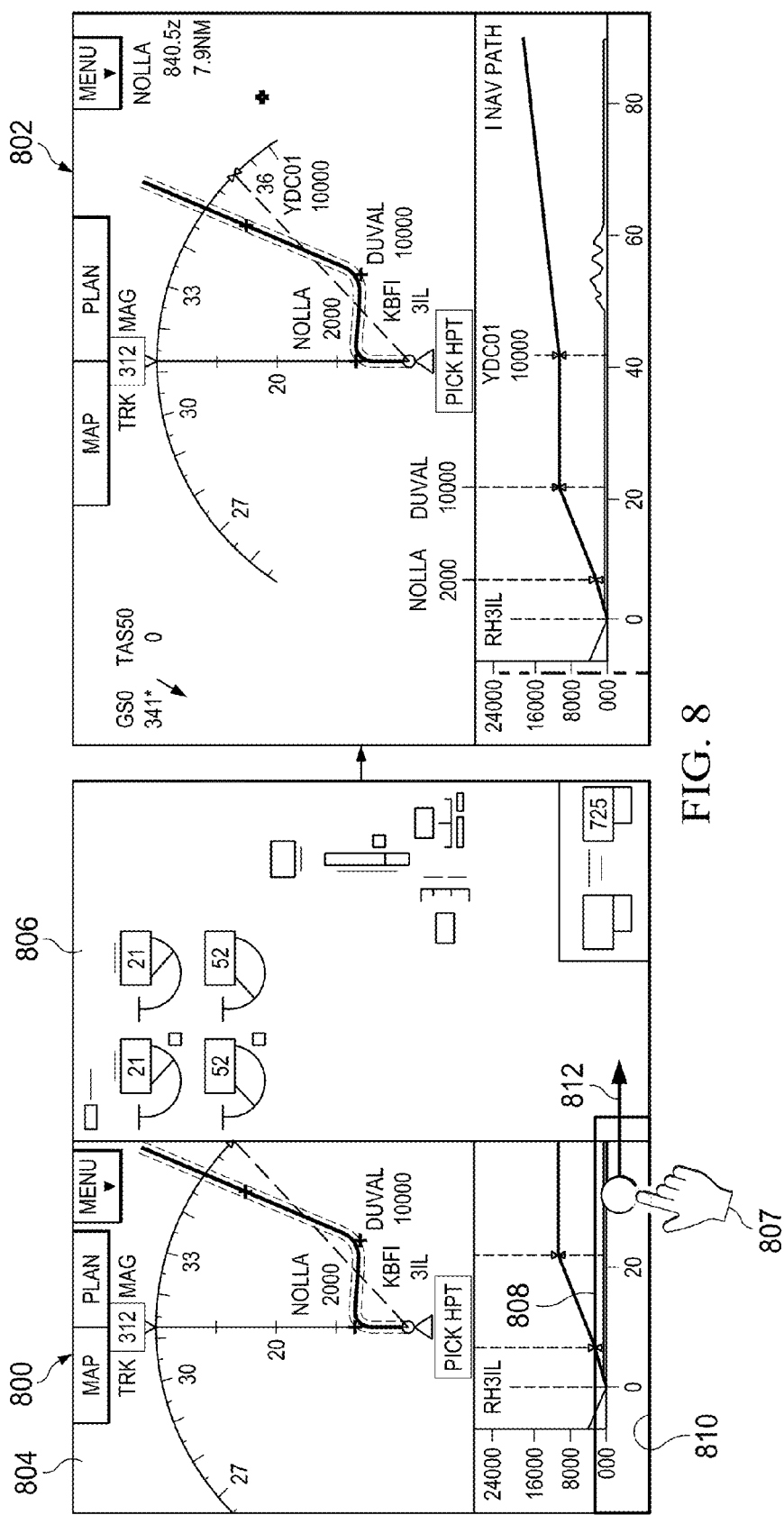
FIG. 8 is an illustration of changing a display from a partial format display to a full format display in accordance with an illustrative embodiment.

Turning to FIG. 8, an illustration of changing a display from a partial format display to a full format display is depicted in accordance with an illustrative embodiment. Display 800 may be an example of partial format 175 for display 134 on touch screen 108 and display 802 may be an example of full format 178 for display 134 on touch screen 108 in FIG. 1.

Display 800 is a partial format display comprising first format 804 displayed on the left side of display 800 and second format 806 displayed at the same time on the right side of display 800. Partial format display 800 may be changed to a full format display in response to an operator interaction with an edge area on display 800. For example, without limitation, partial format display 800 may be changed to full format display 802 in response slide action 807 by an operator in edge area 808 along bottom edge 810 of display 800 to the right, in the direction of arrow 812. In this example, full format display 802 comprises a full format display of first format 804 displayed on the left side of partial format display 800.

Figure 9:
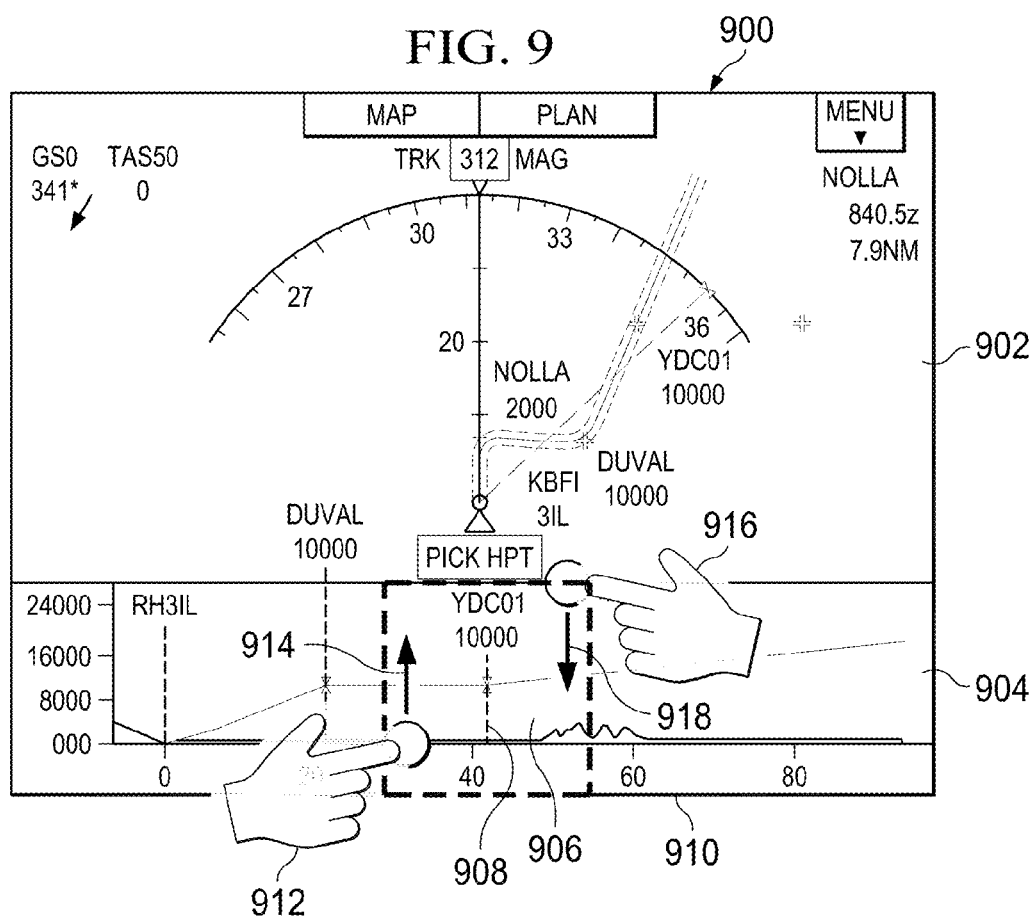
FIG. 9 is an illustration of controlling the display of a vertical situation display in a navigation display in accordance with an illustrative embodiment.

Turning to FIG. 9, an illustration of controlling the display of a vertical situation display in a navigation display is depicted in accordance with an illustrative embodiment. Navigation display 900 may be an example of one implementation of navigation display 142 displayed on touch screen 108 in FIG. 1.

Navigation display 900 includes map display 902 and vertical situation display 904. In this example, map display 902 is displayed in the top portion of navigation display 900 and vertical situation display 904 is displayed in the bottom portion of navigation display 900.

The display of vertical situation display 904 in navigation display 900 may be controlled in response to operator interaction with center area 906 of navigation display 900. For example, without limitation, center area 906 may be located at horizontal center 908 of navigation display 900 along bottom edge 910 of navigation display 900. Center area 906 may be considered to be located at horizontal center 908 of navigation display 900 if any portion of center area 906 is located on horizontal center 908 of navigation display 900.

For example, without limitation, if vertical situation display 904 is not displayed in navigation display 900, vertical situation display 904 may be displayed in navigation display 900 in response to slide action 912 by an operator in center area 906 upward, in the direction of arrow 914. Vertical situation display 904 may cease to be displayed in navigation display 900 in response to slide action 916 by an operator in center area 906 downward, in the direction of arrow 918.

Figure 10:
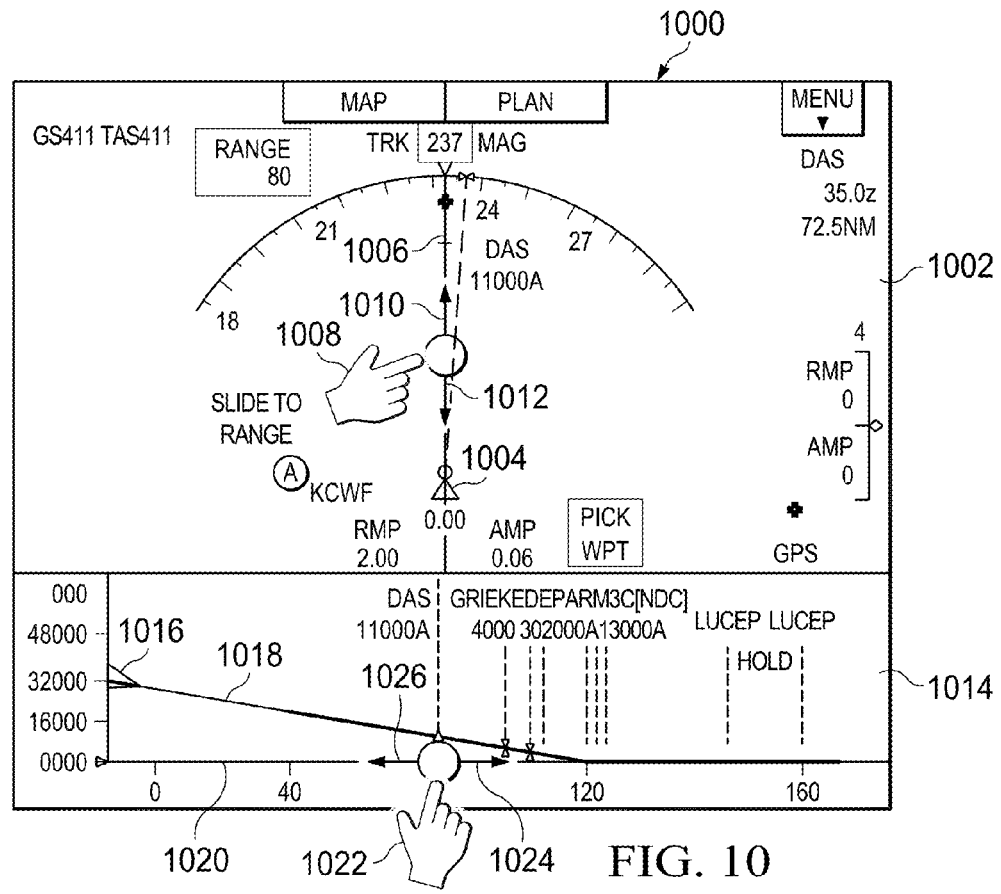
FIG. 10 is an illustration of controlling the range of a navigation display in accordance with an illustrative embodiment.

Turning to FIG. 10, an illustration of controlling the range of a navigation display is depicted in accordance with an illustrative embodiment. Navigation display 1000 may be an example of one implementation of navigation display 142 displayed on touch screen 108 in FIG. 1.

The range of navigation display 1000 may be changed in response to operator interaction with navigation display 1000. For example, without limitation, the range of navigation display 1000 may be changed by an amount corresponding to the length of a slide action by an operator on navigation display 1000. The range of navigation display 1000 may be increased or decreased in response to the direction of the slide action by the operator on navigation display 1000.

Navigation display 1000 includes map display 1002. Map display 1002 includes aircraft indicator 1004 and track line 1006. Aircraft indicator 1004 indicates the current location of an aircraft on map display 1002. Track line 1006 indicates a route of travel for the aircraft. The range of navigation display 1000 may be changed in response to slide action 1008 by an operator along track line 1006. For example, the range of navigation display 1000 may be increased in response to slide action 1008 by an operator along track line 1006 away from aircraft indicator 1004, in the direction of arrow 1010. The range of navigation display 1000 may be decreased in response to slide action 1008 by an operator along track line 1006 toward aircraft indicator 1004, in the direction of arrow 1012.

Navigation display 1000 also may include vertical situation display 1014. Vertical situation display 1014 may include aircraft indicator 1016 and indicator 1018 of the altitude of the aircraft with respect to distance markers 1020. Aircraft indicator 1016 indicates the current altitude of the aircraft. Distance markers 1020 indicate distance from the aircraft. For example, the range of navigation display 1000 may be increased in response to slide action 1022 by an operator along distance markers 1020 away from aircraft indicator 1016 to the right, in the direction of arrow 1024. The range of navigation display 1000 may be decreased in response to slide action 1022 by the operator along distance markers 1020 toward aircraft indicator 1016 to the left, in the direction of arrow 1026.

Figure 11:
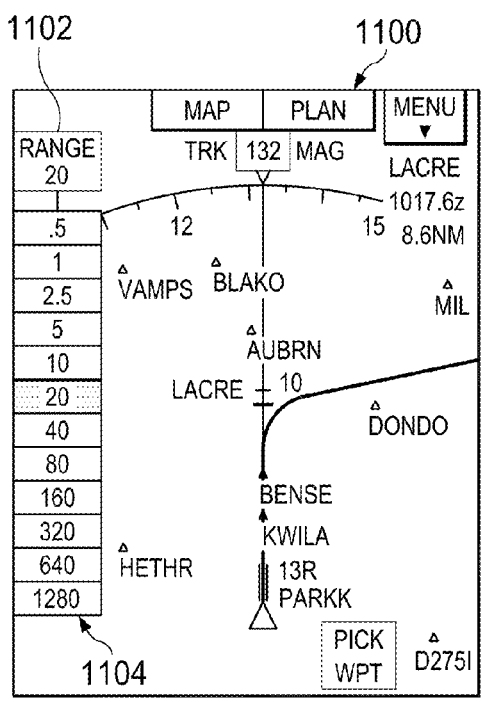
FIG. 11 is an illustration of controlling the range of a navigation display using a range button and a range menu in accordance with an illustrative embodiment.

Turning to FIG. 11, an illustration of controlling the range of a navigation display using a range button and a range menu is depicted in accordance with an illustrative embodiment. Navigation display 1100 may be an example of one implementation of navigation display 142 displayed on touch screen 108 in FIG. 1.

Navigation display 1100 may include range button 1102. Range menu 1104 may be displayed on navigation display 1100 in response to operator interaction with range button 1102. For example, range menu 1104 may be displayed on navigation display 1100 in response to a touch by the operator on range button 1102.

Range menu 1104 may indicate various possible values for the range of navigation display 1100. The range of navigation display 1100 may be changed to a selected value in response to an operator interaction with the corresponding value in range menu 1104.

Figure 12:
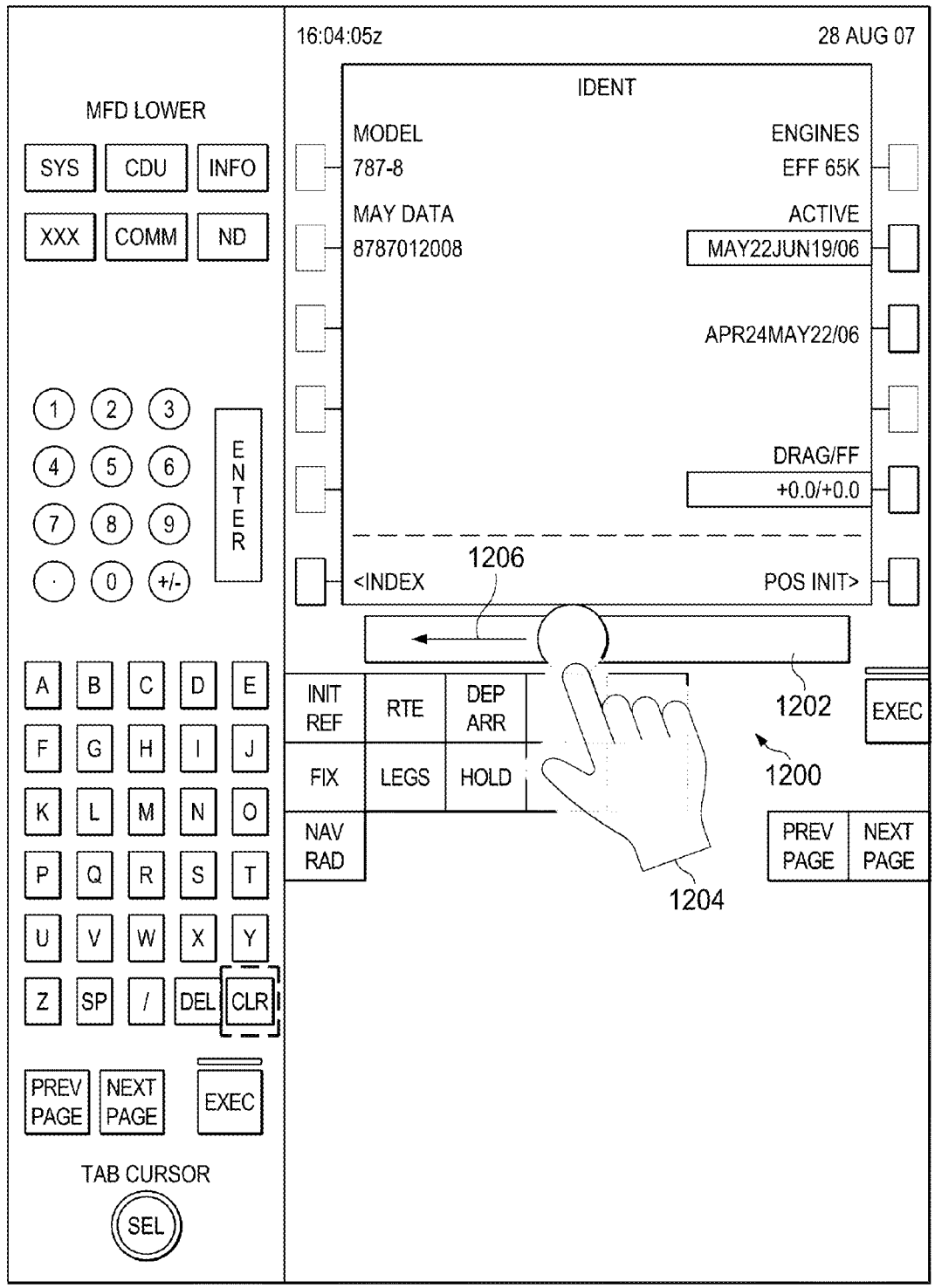
FIG. 12 is an illustration of changing the content of a scratchpad display in accordance with an illustrative embodiment.

Turning to FIG. 12, an illustration of changing the content of a scratchpad display is depicted in accordance with an illustrative embodiment. Scratchpad display 1200 may be an example of one implementation of scratchpad display 144 displayed on touch screen 108 in FIG. 1.

Content may be entered into window 1202 of scratchpad display 1200 by an operator. All content in window 1202 of scratchpad display 1200 may be removed in response to slide action 1204 by an operator across window 1202 of scratchpad display 1200 to the left, in the direction of arrow 1206. Previous content of scratchpad display 1200 may be added to window 1202 of scratchpad display 1200 in response to a slide action by the operator across scratchpad display 1200 in the opposite direction, to the right.

Figure 13:
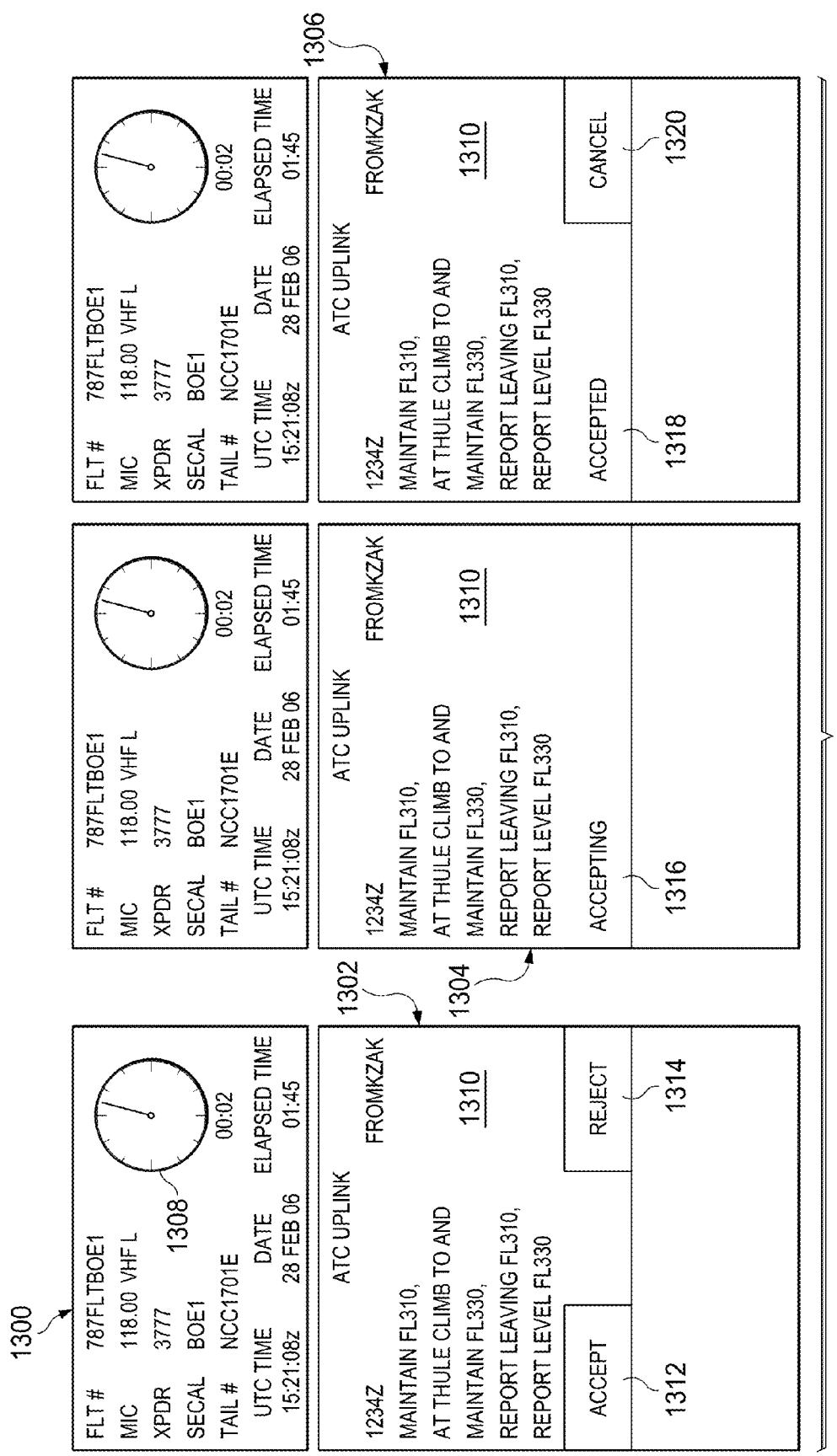
FIG. 13 is an illustration of a chronograph display and a message display in accordance with an illustrative embodiment.

Turning to FIG. 13, an illustration of a chronograph display and a message display is depicted in accordance with an illustrative embodiment. Chronograph display 1300 may be an example of one implementation of chronograph display 146 displayed on touch screen 108 in FIG. 1. Message displays 1302, 1304, and 1306 may be examples of implementations of message display 148 displayed on touch screen 108 in FIG. 1.

Chronograph display 1300 is configured for displaying and controlling a chronograph or timer on an aircraft. Operation of the chronograph or timer on the aircraft may be controlled in response to operator interaction with chronograph display 1300. For example, chronograph display 1300 may include clock image 1308. Operation of the chronograph or timer on the aircraft may be controlled in response to operator interaction with clock image 1308 on chronograph display 1300. For example, consecutive touches or other operator interactions with clock image 1308 may start, stop, and deactivate the chronograph or timer.

Message display 1302 includes the display of message 1310 received by an aircraft. In this example, message 1310 is a data link message received by the aircraft from an air traffic controller. An operator of the aircraft may handle message 1310 received by the aircraft by operator interaction with message display 1302. For example, accept button 1312 and reject button 1314 may be displayed on message display 1302 along with message 1310 in response to receiving message 1310 on the aircraft. Message 1310 may be rejected in response to a touch or other operator interaction with reject button 1314 on message display 1302. Message 1310 may be accepted in response to a touch or other operator interaction with accept button 1312.

Message display 1304 is an example of message display 1302 after operator interaction with accept button 1312 in message display 1302. Indicator 1316 in message display 1304 indicates that message 1310 is being accepted in response to the operator interaction with accept button 1312 in message display 1302.

Message display 1306 is an example of message display 1304 after message 1310 is accepted. Indicator 1318 in message display 1306 indicates that message 1310 has been accepted. Cancel button 1320 also may be displayed in message display 1306. Message 1310 may be canceled in response to a touch or other operator interaction with cancel button 1320 in message display 1306.

Figure 14:
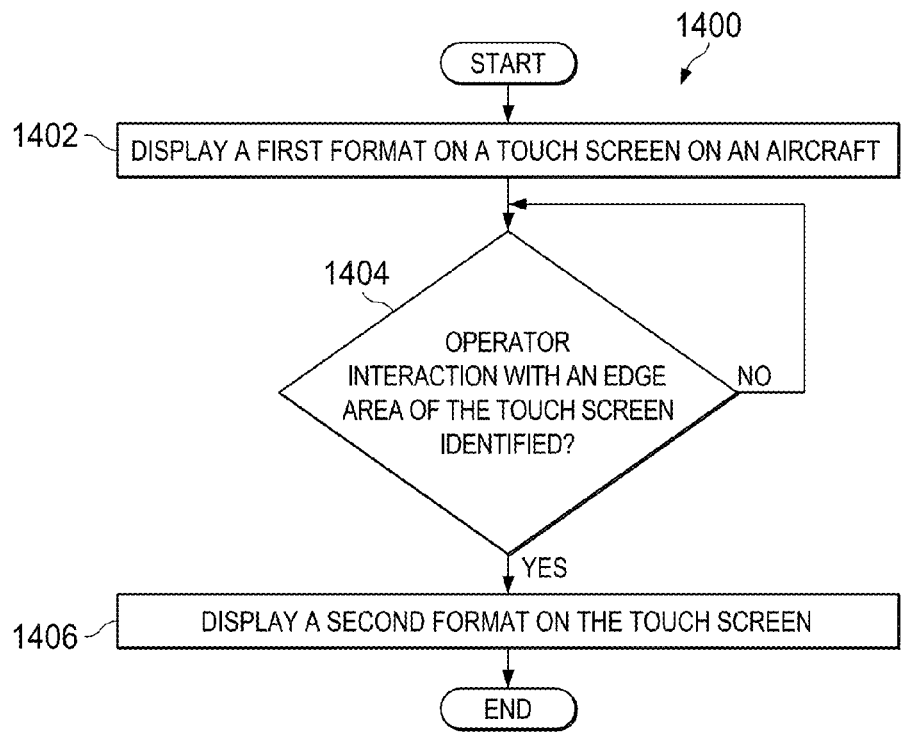
FIG. 14 is an illustration of a flowchart of a process for controlling the format of a display in accordance with an illustrative embodiment.

Turning to FIG. 14, an illustration of a flowchart of a process for controlling the format of a display is depicted in accordance with an illustrative embodiment. For example, process 1400 may be implemented in controller 112 for controlling format 168 of display 134 on touch screen 108 in FIG. 1.

Process 1400 may begin by displaying a first format on a touch screen on an aircraft (operation 1402). It may be determined whether operator interaction with an edge area of the touch screen is identified (operation 1404) while the first format is displayed on the touch screen. The edge area may be an area along one or more of the left edge, right edge, and bottom edge of the touch screen. The operator interaction with the edge area may be a touch, a slide action, or any other appropriate interaction or combination of interactions. If an operator interaction with the edge area is not identified, operation 1404 may be repeated until an operator interaction with the edge area is identified. A second format is displayed on the touch screen in response to identifying an operator interaction with the edge area of the touch screen (operation 1406), with the process terminating thereafter. The second format displayed on the touch screen may be different from the first format displayed on the touch screen.

Figure 15:
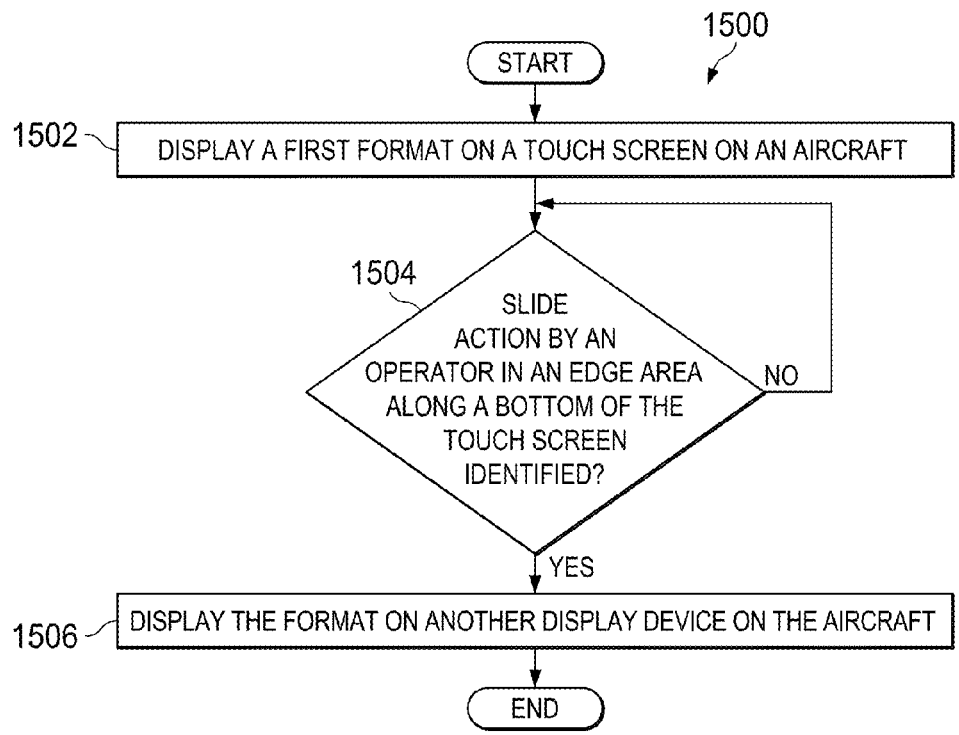
FIG. 15 is an illustration of a flowchart of a process for moving the display of a format to another display device in accordance with an illustrative embodiment.

Turning to FIG. 15, an illustration of a flowchart of a process for moving the display of a format to another display device is depicted in accordance with an illustrative embodiment. For example, process 1500 may be implemented in controller 112 for moving format 168 of display 134 from touch screen 108 to other display device 174 in FIG. 1.

Process 1500 may begin by displaying a format on a touch screen on an aircraft (operation 1502). It then may be determined whether a slide action by an operator in an edge area along the bottom edge of the touch screen is identified (operation 1504). If a slide action by the operator in the edge area along the bottom edge of the touch screen is not identified, operation 1504 may be repeated until a slide action by the operator in the edge area along the bottom edge of the touch screen is identified. The format displayed on the touch screen is displayed on another display device on the aircraft (operation 1506) in response to identifying a slide action by the operator in the edge area along the bottom edge of the touch screen in operation 1504, with the process terminating thereafter.

The display device to which the format displayed on the touch screen is moved in operation 1506 may depend on the direction of the slide action in the edge area along the bottom edge of the touch screen identified in operation 1504. For example, without limitation, the format displayed on the touch screen may be displayed on another display device to the right of the touch screen in response to a slide action by the operator to the right in the edge area along the bottom edge of the touch screen. The format displayed on the touch screen may be displayed on another display device to the left of the touch screen in response to a slide action by the operator to the left in the edge area along the bottom edge of the touch screen.

Figure 16:
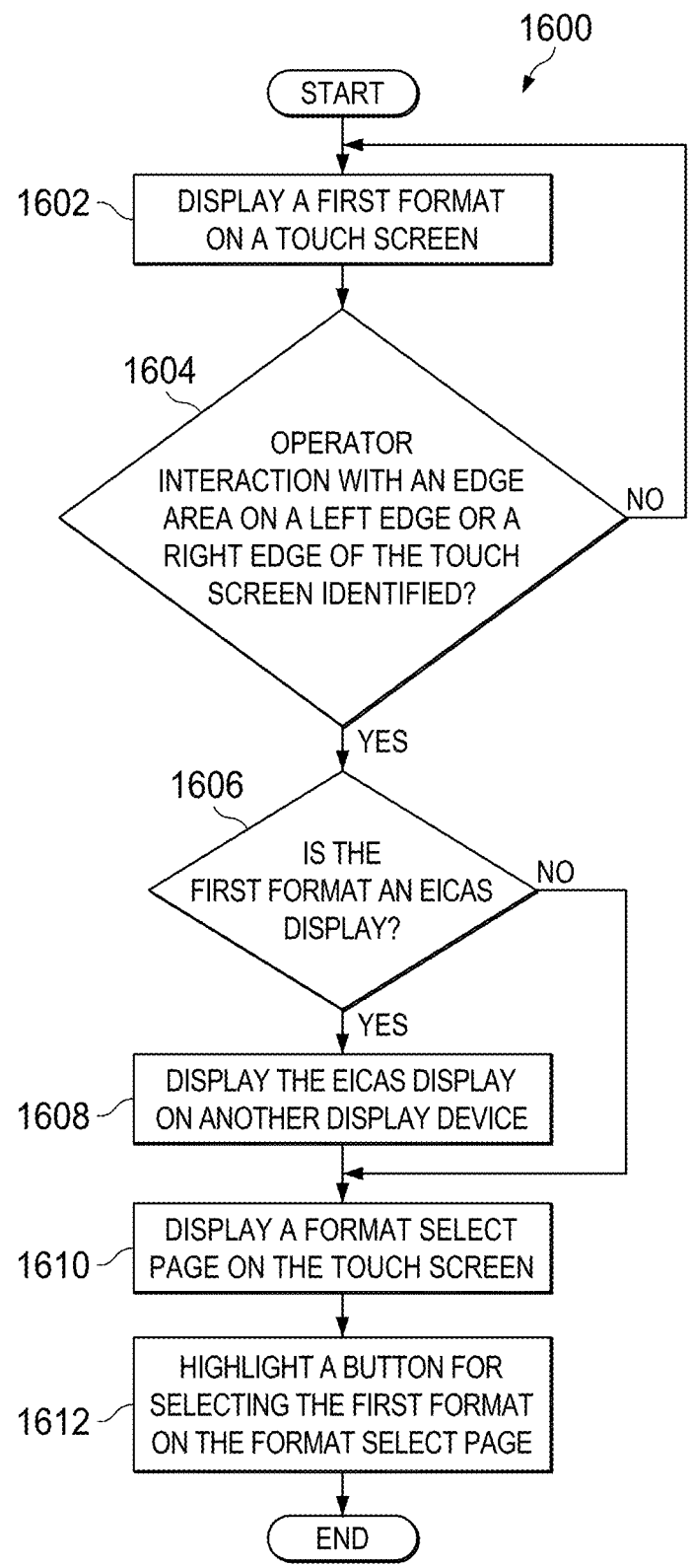
FIG. 16 is an illustration of a flowchart of a process for displaying a format select page in accordance with an illustrative embodiment.

Turning to FIG. 16, an illustration of a flowchart of a process for displaying a format select page is depicted in accordance with an illustrative embodiment. For example, process 1600 may be performed by controller 112 for controlling the display of format select page 166 on display 134 in FIG. 1.

Process 1600 may begin by displaying a first format on a touch screen on an aircraft (operation 1602). The first format may be a format for a display other than a format select page. It then may be determined whether an operator interaction with an edge area on the left edge or the right edge of the touch screen is identified (operation 1604). Operations 1602 and 1604 may be repeated until an operator interaction with an edge area on the left edge or the right edge of the touch screen is identified. For example, without limitation, the operator interaction may be a slide action by the operator in the edge area on the left edge or the right edge of the touch screen.

In response to identifying an operator interaction with the edge area on the left edge or the right edge of the touch screen it may be determined whether the first format displayed on the touch screen is an engine-indicating and crew-alerting system, EICAS, display (operation 1606). If the first format is an EICAS display, the EICAS display may be displayed on another display device on the aircraft (operation 1608). The other display device may be a touch screen or another type of display device on the aircraft. A format select page then may be displayed on the touch screen (operation 1610). Automatically moving an EICAS display to the other display device in this manner assures that the important information displayed in an EICAS display remains displayed somewhere on the aircraft when the EICAS display on the touch screen is replaced with the format select page in response to the operator interaction with the edge area of the touch screen. If it is determined at operation 1606 that the first format displayed on the touch screen is not an EICAS display, the format select page may be displayed on the touch screen at operation 1610 without first moving the first format displayed on the touch screen to another display device.

The format select page may be configured to allow an operator to select which format from a number of formats to display on the touch screen. For example, the format select page may include a number of buttons corresponding to a number of formats that may be displayed on the touch screen. One of the buttons on the format select page corresponding to the first format that was displayed on the touch screen immediately before the format select page was displayed on the touch screen may be highlighted in an appropriate manner (operation 1612), with the process terminating thereafter.

Figure 17:
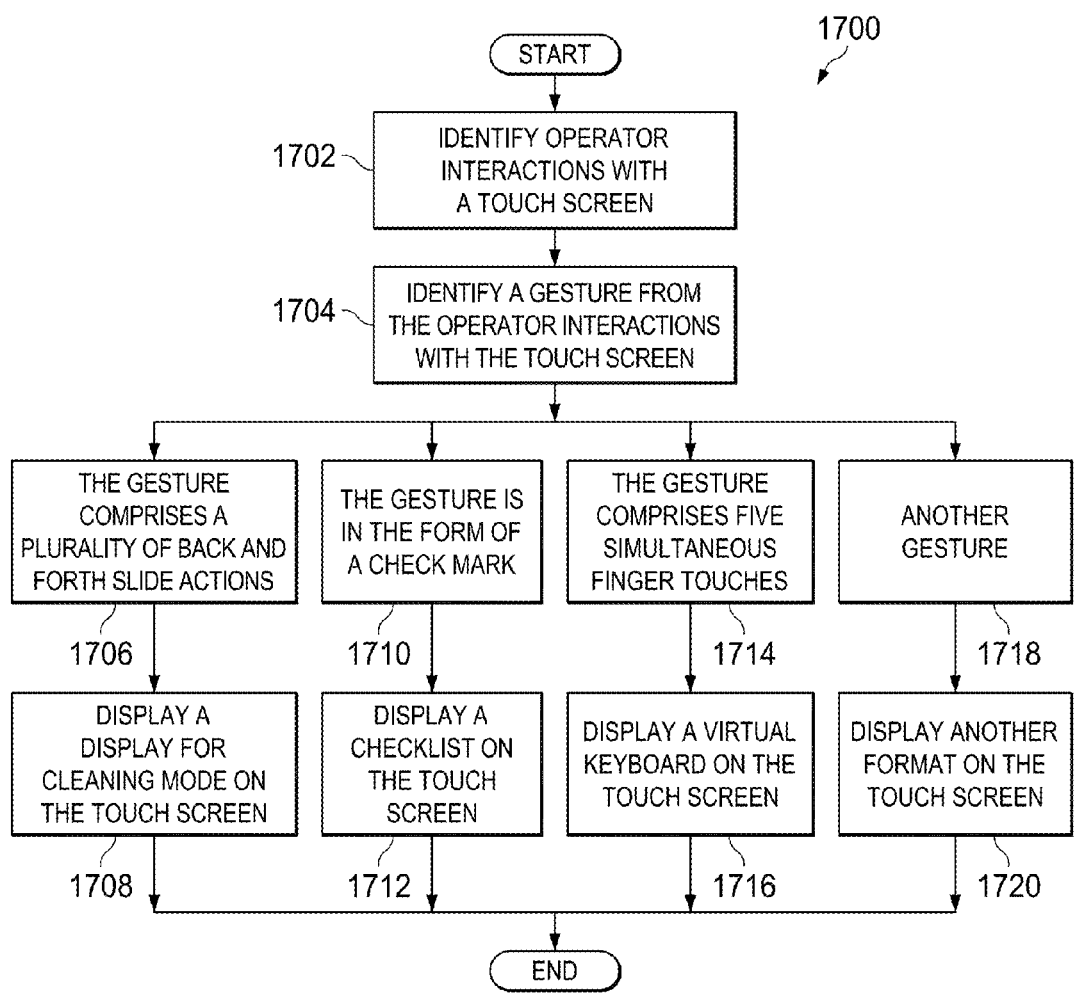
FIG. 17 is an illustration of a flowchart of a process using gestures to control a display in accordance with an illustrative embodiment.

Turning to FIG. 17, an illustration of a flowchart of a process using gestures to control a display is depicted in accordance with an illustrative embodiment. For example, process 1700 may be implemented in controller 112 for controlling formats 133 displayed on touch screen 108 by operator interaction 106 with touch screen 108 comprising gesture 132 in FIG. 1.

Process 1700 may begin by identifying operator interactions with a touch screen (operation 1702). A gesture may be identified from the operator interactions (operation 1704). For example, an operator may form a gesture on the touch screen by any appropriate combination of touches, slide actions, and other interactions performed simultaneously, in sequence, or both. For example, a gesture may comprise a recognizable shape or pattern formed on the touch screen by any appropriate combination of touches, slide actions, and other interactions with the touch screen.

In response to identifying a gesture comprising a plurality of back and forth slide actions (operation 1706) a cleaning mode for the touch screen may be entered and a display for the cleaning mode may be displayed on the touch screen (operation 1708), with the process terminating thereafter. In response to identifying a gesture in the form of a check mark (operation 1710), a checklist may be displayed on the touch screen (operation 1712), with the process terminating thereafter. In response to identifying a gesture comprising five simultaneous finger touches (operation 1714), a virtual keyboard may be displayed on the touch screen (operation 1716), with the process terminating thereafter. In response to identifying another gesture (operation 1718), another format may be displayed on the touch screen (operation 1720), with the process terminating thereafter.

Figure 18:
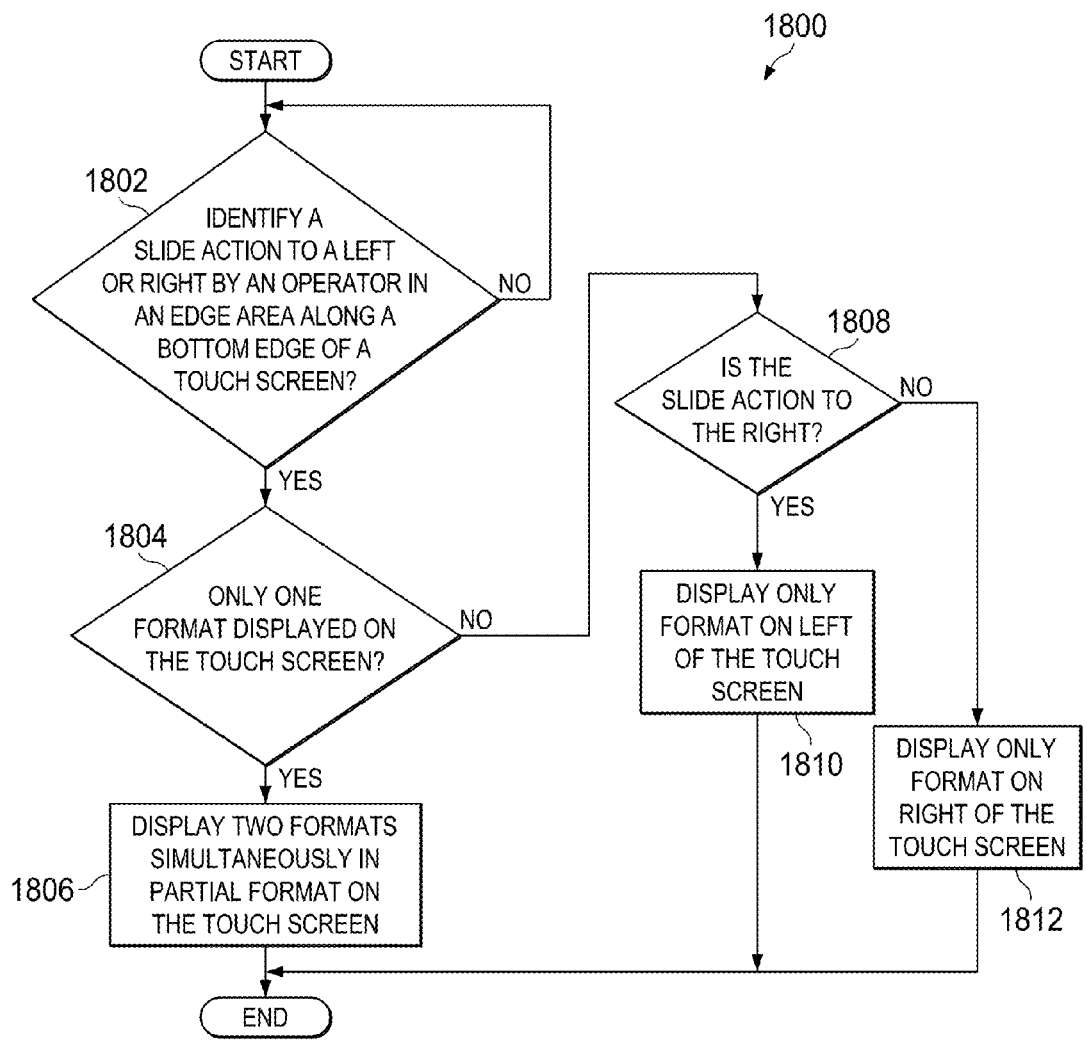
FIG. 18 is an illustration of a flowchart of a process for changing a display between a full format display and a partial format display in accordance with an illustrative embodiment.

Turning to FIG. 18, an illustration of a flowchart of a process for changing a display between a full format display and a partial format display is depicted in accordance with an illustrative embodiment. For example, process 1800 may be implemented in controller 112 for changing display 134 on touch screen 108 in FIG. 1 from partial format 175 to full format 178 and vice versa.

Process 1800 may begin by identifying a slide action to the left or to the right by an operator in an edge area along a bottom edge of a touch screen (operation 1802). Operation 1802 may be repeated until a slide action to the left or to the right by an operator in the edge area along the bottom edge of the touch screen is identified. In response to identifying a slide action to the left or to the right by the operator in the edge area along the bottom edge of the touch screen, it may be determined whether only one format is currently displayed on the touch screen (operation 1804). The current display is a full format display if only one format is currently displayed on the touch screen. In response to a determination that only one format is currently displayed on the touch screen, two formats may be displayed simultaneously in partial format on the touch screen (operation 1806) in response to identifying a slide action to the left or to the right by the operator in the edge area along the bottom edge of the touch screen, with the process terminating thereafter. For example, the full format currently displayed on the touch screen may be displayed as a partial format on the left side of the touch screen in response to a slide action by the operator to the left in the edge area along the bottom edge of touch screen. The full format currently displayed on the touch screen may be displayed as a partial format on the right side of the touch screen in response to a slide action by the operator to the right in the edge area along the bottom edge of the touch screen.

If it is determined at operation 1804 that more than one format is currently displayed on the touch screen, then the current display may be a partial format display with a first format displayed on the left side of the touch screen and a second format displayed on the right side of the touch screen. In this case, it may be determined whether the slide action by the operator in the edge area along the bottom edge of the touch screen is a slide action to the right (operation 1808). In response to determining that the slide action is to the right, only the format displayed on the left side of the touch screen is displayed in full format on the touch screen (operation 1810), with the process terminating thereafter. In response to a determination at operation 1808 that the slide action by the operator in the edge area along the bottom edge of the touch screen is not a slide action to the right, it may be assumed that the slide action is a slide action to the left. In this case, only the format displayed on the right side of the touch screen is displayed in full format on the touch screen (operation 1812), with the process terminating thereafter.

Figure 19:
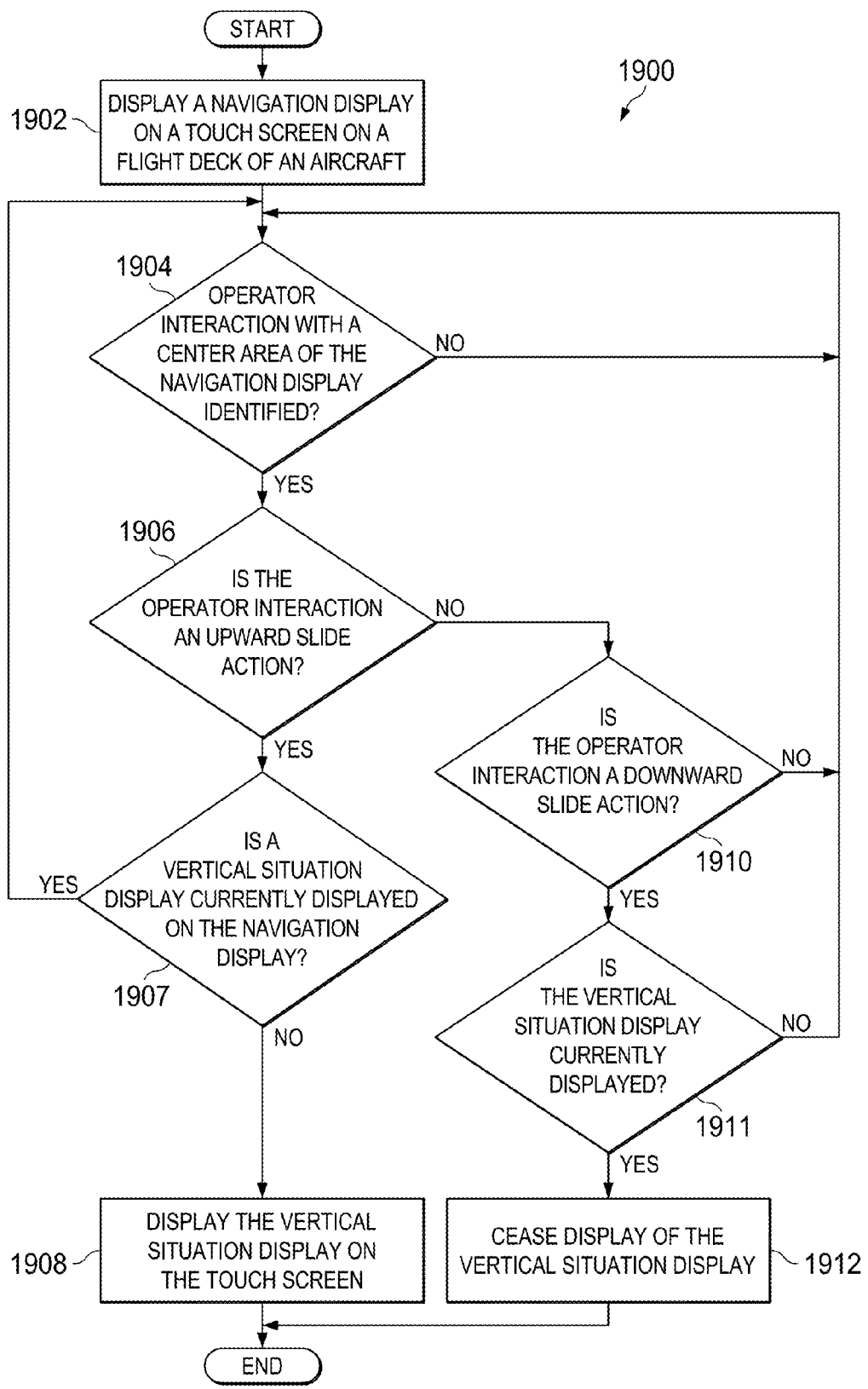
FIG. 19 is an illustration of a flowchart of a process for controlling the display of a vertical situation display in a navigation display in accordance with an illustrative embodiment.

Turning to FIG. 19, an illustration of a flowchart of a process for controlling the display of a vertical situation display in a navigation display is depicted in accordance with an illustrative embodiment. For example, process 1900 may be implemented in controller 112 for controlling the display of vertical situation display 180 in navigation display 142 displayed on touch screen 108 in FIG. 1.

Process 1900 may begin by displaying a navigation display on a touch screen on the flight deck of an aircraft (operation 1902). It then may be determined whether an operator interaction with a center area of the navigation display is identified (operation 1904). The center area of the navigation display may be located at the horizontal center of the navigation display along the bottom edge of the navigation display. Operation 1904 may be repeated until an operator interaction with the center area of the navigation display is identified.

In response to identifying an operator interaction with the center area of the navigation display, it may be determined whether the operator interaction is an upward slide action (operation 1906). In response to a determination that the operator interaction is an upward slide action, it may be determined whether the vertical situation display is currently displayed on the navigation display (operation 1907). If the vertical situation display is currently displayed, the process may return to operation 1904 to identify another operator interaction with the center area of the navigation display. If the vertical situation display is not currently displayed, the vertical situation display may be displayed on the touch screen (operation 1908) in response to the identification of the upward slide action in the center area of the navigation display, with the process terminating thereafter.

If it is determined at operation 1906 that the operator interaction with the center area of the navigation display is not an upward slide action, it may be determined whether the operator interaction with the center area of the navigation display is a downward slide action (operation 1910). If the operator interaction is not a downward slide action, the process may return to operation 1904 to identify another operator interaction with the center area of the navigation display. If the operation interaction with the center area of the navigation display is a downward slide action, it may be determined whether the vertical situation display is currently displayed (operation 1911). If the vertical situation display is not currently displayed, the process may return to operation 1904 to identify another operator interaction with the center area of the navigation display. If the vertical situation display is currently displayed, then the vertical situation display may cease to be displayed (operation 1912) in response to the identification of the downward slide action in the center area of the navigation display, with the process terminating thereafter.

Figure 20:
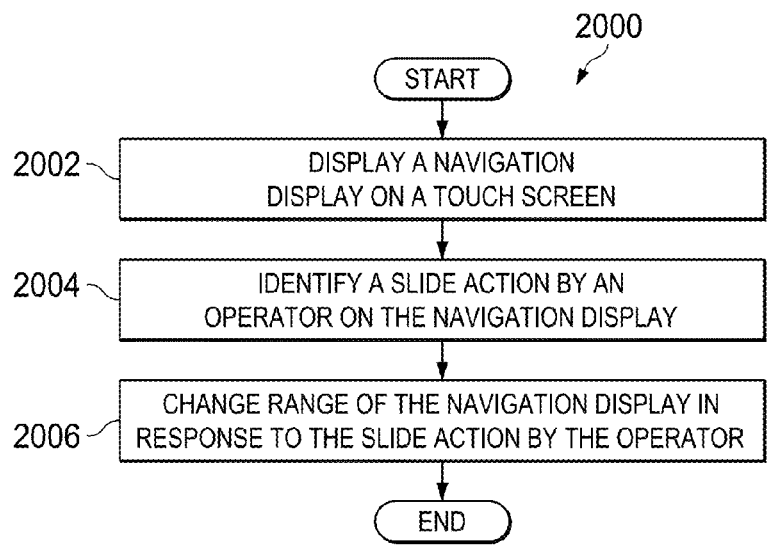
FIG. 20 is an illustration of a flowchart of a process for controlling the range of a navigation display in accordance with an illustrative embodiment.

Turning to FIG. 20, an illustration of a flowchart of a process for controlling the range of a navigation display is depicted in accordance with an illustrative embodiment. For example, process 2000 may be implemented in controller 112 for changing range 185 of navigation display 142 displayed on touch screen 108 in FIG. 1.

Process 2000 may begin by displaying a navigation display on a touch screen (operation 2002). For example, the navigation display may include a map display and a vertical situation display. A slide action by an operator on the navigation display may be identified (operation 2004). For example, without limitation, the slide action may be a slide action along a track line in the map display or a slide action along distance markers in the vertical situation display. The range of the navigation display may be changed in response to the slide action by the operator (operation 2006), with the process terminating thereafter. For example, the range of the navigation display may be changed by an amount corresponding to the length of the slide action in the navigation display. The range of the navigation display may be increased or decreased based on the direction of the slide action by the operator in the navigation display.

Figure 21:
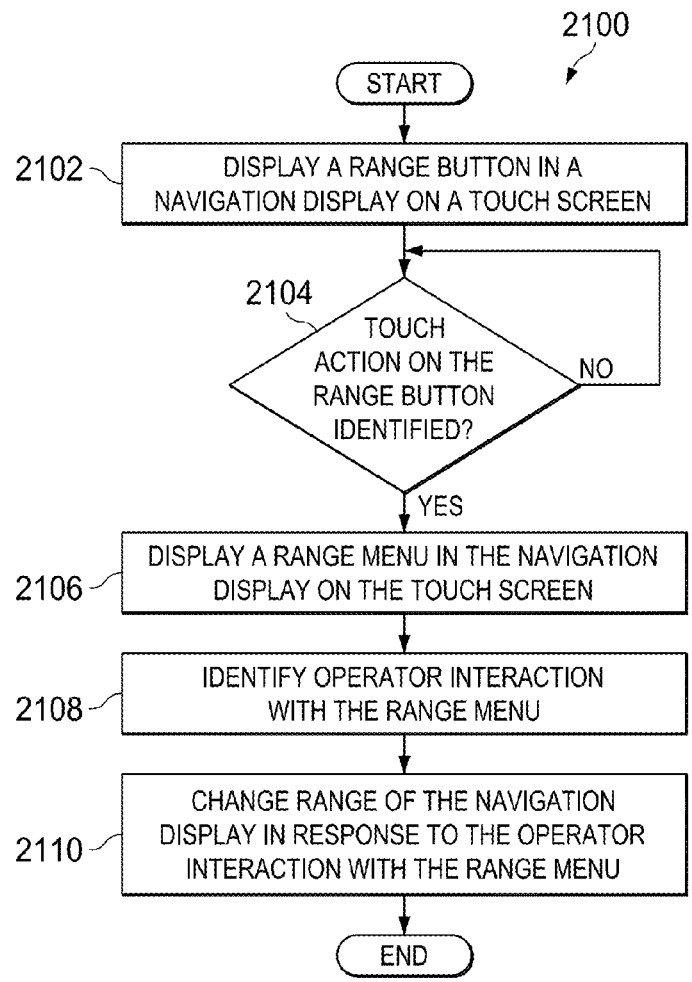
FIG. 21 is an illustration of a flowchart of another process for controlling the range of a navigation display in accordance with an illustrative embodiment.

Turning to FIG. 21, an illustration of a flowchart of another process for controlling the range of a navigation display is depicted in accordance with an illustrative embodiment. For example, process 2100 may be implemented in controller 112 for changing range 185 of navigation display 142 displayed on touch screen 108 in FIG. 1.

Process 2100 may begin by displaying a range button in a navigation display displayed on a touch screen (operation

2102). It then may be determined whether a touch action on the range button is identified (operation 2104). Operation 2104 may be repeated until a touch action by an operator on the range button is identified. A range menu may be displayed in the navigation display on the touch screen in response to identifying a touch action on the range button (operation 2106). The range menu may include indications for a number of possible values for the range of the navigation display. An operator interaction with the range menu may be identified (operation 2108). The range of the navigation display may be changed in response to the operator interaction with the range menu (operation 2110), with the process terminating thereafter. For example, the range of the navigation display may be changed to one of the values in the range menu in response to an operator interaction with the indication of that value in the range menu.

Figure 22:
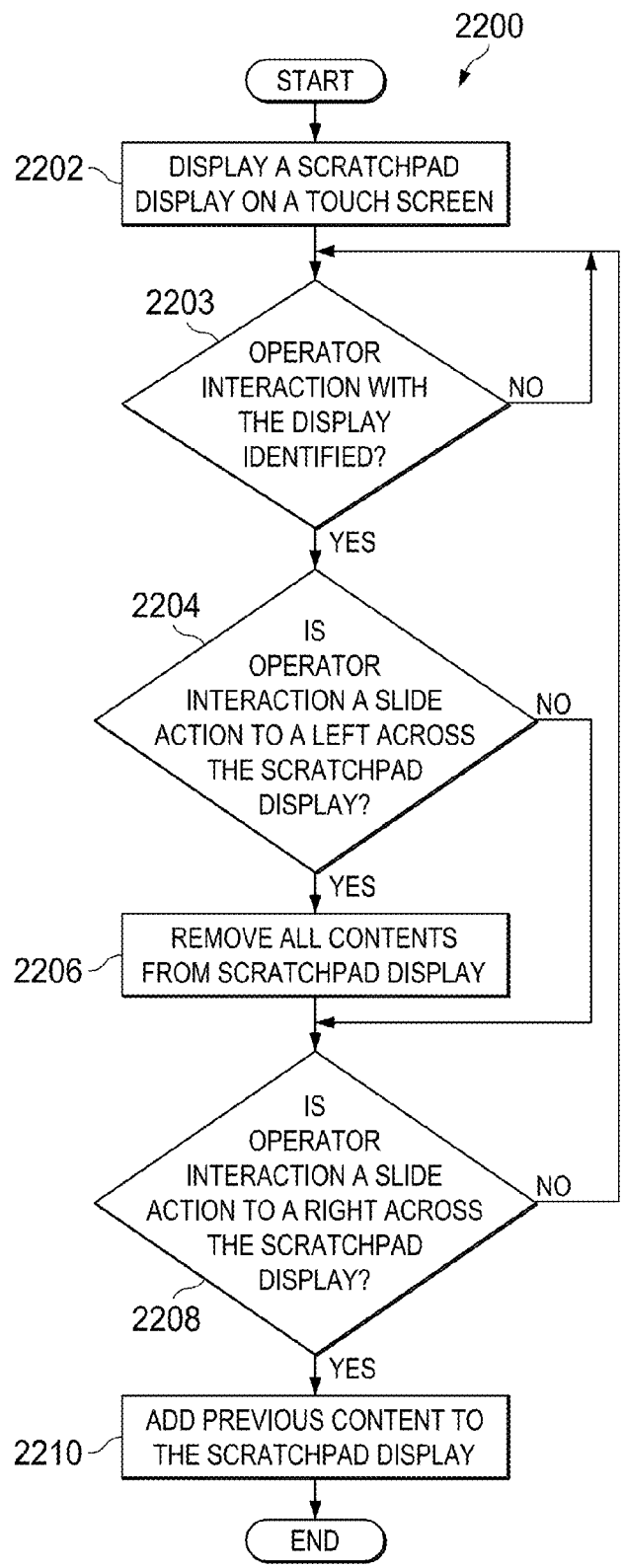
FIG. 22 is an illustration of a flowchart of a process for controlling the content of a scratchpad display in accordance with an illustrative embodiment.

Turning to FIG. 22, an illustration of a flowchart of a process for controlling the content of a scratchpad display is depicted in accordance with an illustrative embodiment. For example, process 2200 may be implemented in controller 112 for controlling content 191 of scratchpad display 144 displayed on touch screen 108 in FIG. 1.

Process 2200 may begin by displaying a scratchpad display on a touch screen (operation 2202). It then may be determined whether an operator interaction with the scratchpad display is identified (operation 2203). Operation 2203 may be repeated until an operator interaction with the scratchpad display is identified. In response to identifying an operator interaction with the scratchpad display, it may be determined whether the operator interaction is a slide action to the left across the scratchpad display (operation 2204). All content may be removed from the scratchpad display (operation 2206) when a slide action to the left across the scratchpad display is identified.

In response to a determination at operation 2204 that the operator interaction with the scratchpad display is not a slide action to the left, it may be determined whether the operator interaction is a slide action to the right across the scratchpad display (operation 2208). Previous content may be added to the scratchpad display when a slide action to the right across the scratchpad display is identified (operation 2210), with the process terminating thereafter. For example, operation 2210 may include adding the content most recently removed from the scratchpad display back into the scratchpad display in response to a slide action to the right across the scratchpad display. In response to a determination at operation 2208 that the operator interaction with the scratchpad display is not a slide action to the right, process 2200 may return to operation 2203 to identify another operator interaction with the scratchpad display.

Figure 23:
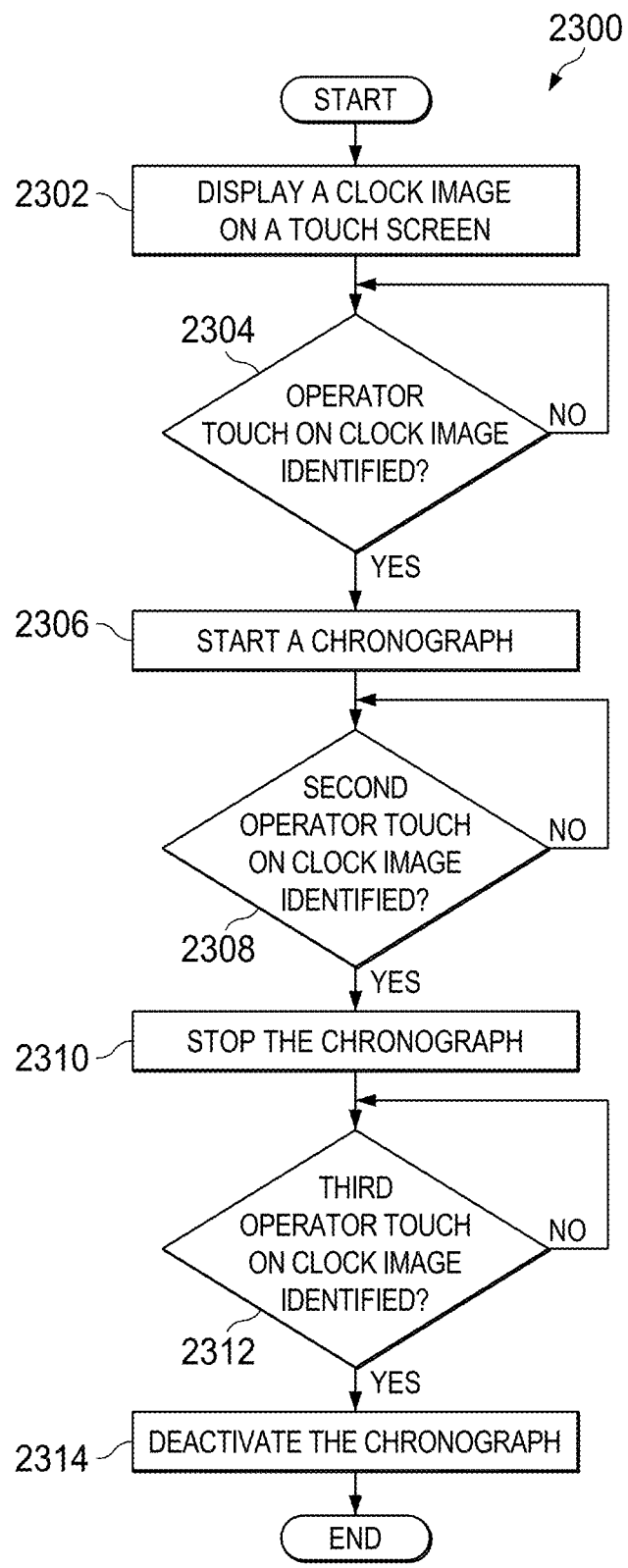
FIG. 23 is an illustration of a flowchart of a process for controlling a chronograph in accordance with an illustrative embodiment.

Turning to FIG. 23, an illustration of a flowchart of a process for controlling a chronograph is depicted in accordance with an illustrative embodiment. For example, process 2300 may be implemented in controller 112 for controlling operation of a chronograph or timer on aircraft 100 displayed in chronograph display 146 on touch screen 108 in FIG. 1.

Process 2300 may begin by displaying a clock image on the touch screen (operation 2302). For example, without limitation, the clock image may include an image of an analog clock face. It then may be determined whether an operator touch on the clock image is identified (operation 2304). Operation 2304 may be repeated until an operator touch on the clock image is identified. The chronograph or timer may be started (operation 2306) in response to identifying an operator touch on the clock image.

It then may be determined whether a second operator touch on the clock image is identified (operation 2308). Operation 2308 may be repeated until a second operator touch on the clock image is identified. The chronograph or timer may be stopped (operation 2310) in response to identifying the second operator touch on the clock image.

It then may be determined whether a third operator touch on the clock image is identified (operation 2312). Operation 2312 may be repeated until a third operator touch on the clock image is identified. The chronograph or timer may be deactivated (operation 2314) in response to identifying the third operator touch on the clock image, with the process terminating thereafter. The chronograph or timer may be cleared when the chronograph or timer is deactivated at operation 2314.

Figure 24:
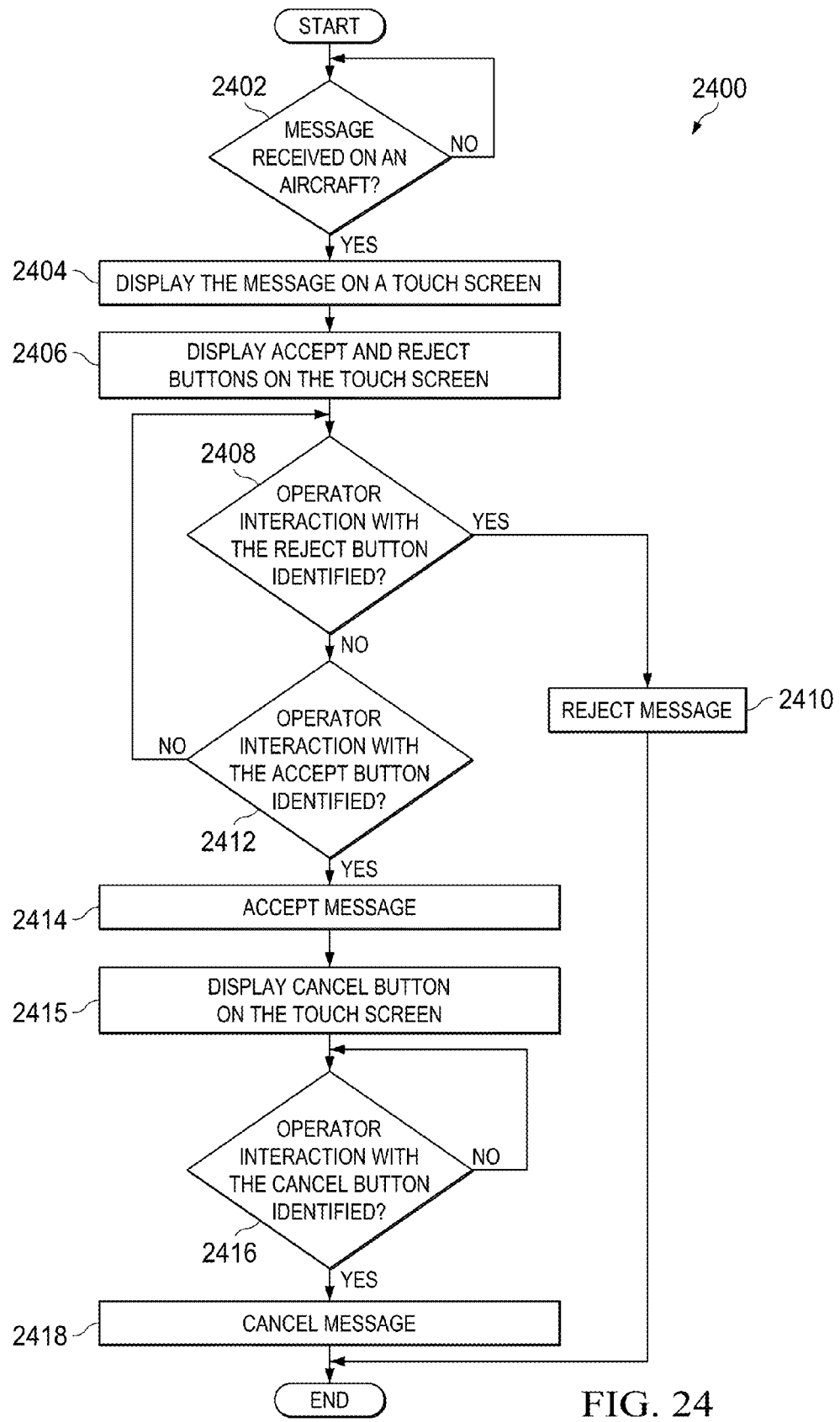
FIG. 24 is an illustration of a flowchart of a process for handling a message on an aircraft in accordance with an illustrative embodiment.

Turning to FIG. 24, an illustration of a flowchart of a process for handling a message on an aircraft is depicted in accordance with an illustrative embodiment. For example, process 2400 may be implemented in controller 112 for allowing operator 104 to handle a message displayed in message display 148 on touch screen 108 in FIG. 1.

Process 2400 may begin by determining whether a message is received on an aircraft (operation 2402). For example, the message may be a data link message from an air traffic controller or another message received by an aircraft. Operation 2402 may be repeated until a message is received on the aircraft. In response to receiving a message on the aircraft, the message may be displayed on a touch screen on the aircraft (operation 2404). For example, the message may be displayed on a message display on the touch screen. Accept and reject buttons also may be displayed on the touch screen (operation 2406) in response to receiving the message on the aircraft.

It may be determined whether an operator interaction with the reject button on the touch screen is identified (operation 2408). The message may be rejected (operation 2410) in response to identifying an operator interaction with the reject button, with the process terminating thereafter.

If an operator interaction with the reject button is not identified at operation 2408, it may be determined whether an operator interaction with the accept button on the touch screen is identified (operation 2412). If an operator interaction with the accept button is not identified, process 2400 may return to operation 2408. Operations 2408 and 2412 may be repeated until an operator interaction with either the reject button or the accept button is identified.

The message may be accepted (operation 2414) in response to identifying an operator interaction with the accept button at operation 2412. For example, an indication that the message has been accepted may be displayed on the touch screen in response to identifying an operator interaction with the accept button. A cancel button also may be displayed on the touch screen (operation 2415) in response to identifying an operator interaction with the accept button. It then may be determined whether an operator interaction with the cancel button on the touch screen is identified (operation 2416). Operation 2416 may be repeated until an operator interaction with the cancel button is identified. The message may be canceled (operation 2418) in response to identifying an operator interaction with the cancel button, with the process terminating thereafter.

Turning to FIG. 25, an illustration of a block diagram of a data processing system is depicted in accordance with an illustrative embodiment. Data processing system 2500 may be an example of one implementation of data processing system 118 on which controller 112 in FIG. 1 may be implemented.

In this illustrative example, data processing system 2500 includes communications fabric 2502. Communications fabric 2502 provides communications between processor unit 2504, memory 2506, persistent storage 2508, communications unit 2510, input/output (I/O) unit 2512, and display 2514. Memory 2506, persistent storage 2508, communications unit 2510, input/output (I/O) unit 2512, and display 2514 are examples of resources accessible by processor unit 2504 via communications fabric 2502.

Processor unit 2504 serves to run instructions for software that may be loaded into memory 2506. Processor unit 2504 may be a number of processors, a multi-processor core, or some other type of processor, depending on the particular implementation. Further, processor unit 2504 may be implemented using a number of heterogeneous processor systems in which a main processor is present with secondary processors on a single chip. As another illustrative example, processor unit 2504 may be a symmetric multi-processor system containing multiple processors of the same type.

Memory 2506 and persistent storage 2508 are examples of storage devices 2516. A storage device is any piece of hardware that is capable of storing information such as, for example, without limitation, data, program code in functional form, and other suitable information either on a temporary basis or a permanent basis. Storage devices 2516 may also be referred to as computer readable storage devices in these examples. Memory 2506, in these examples, may be, for example, a random access memory or any other suitable volatile or non-volatile storage device. Persistent storage 2508 may take various forms, depending on the particular implementation.

Persistent storage 2508 may contain one or more components or devices. For example, persistent storage 2508 may be a hard drive, a flash memory, a rewritable optical disk, a rewritable magnetic tape, or some combination of the above. The media used by persistent storage 2508 also may be removable. For example, a removable hard drive may be used for persistent storage 2508.

Communications unit 2510, in these examples, provides for communications with other data processing systems or devices. In these examples, communications unit 2510 is a network interface card. Communications unit 2510 may provide communications through the use of either or both physical and wireless communications links.

Input/output unit 2512 allows for input and output of data with other devices that may be connected to data processing system 2500. For example, input/output unit 2512 may provide a connection for user input through a keyboard, a mouse, and/or some other suitable input device. Further, input/output unit 2512 may send output to a printer. Display 2514 provides a mechanism to display information to a user.

Instructions for the operating system, applications, and/or programs may be located in storage devices 2516, which are in communication with processor unit 2504 through communications fabric 2502. In these illustrative examples, the instructions are in a functional form on persistent storage 2508. These instructions may be loaded into memory 2506 for execution by processor unit 2504. The processes of the different embodiments may be performed by processor unit 2504 using computer-implemented instructions, which may be located in a memory, such as memory 2506.

These instructions may be referred to as program instructions, program code, computer usable program code, or computer readable program code that may be read and executed by a processor in processor unit 2504. The program code in the different embodiments may be embodied on different physical or computer readable storage media, such as memory 2506 or persistent storage 2508.

Program code 2518 is located in a functional form on computer readable media 2520 that is selectively removable and may be loaded onto or transferred to data processing system 2500 for execution by processor unit 2504. Program code 2518 and computer readable media 2520 form computer program product 2522 in these examples. In one example, computer readable media 2520 may be computer readable storage media 2524 or computer readable signal media 2526.

Computer readable storage media 2524 may include, for example, an optical or magnetic disk that is inserted or placed into a drive or other device that is part of persistent storage 2508 for transfer onto a storage device, such as a hard drive, that is part of persistent storage 2508. Computer readable storage media 2524 also may take the form of a persistent storage, such as a hard drive, a thumb drive, or a flash memory, that is connected to data processing system 2500. In some instances, computer readable storage media 2524 may not be removable from data processing system 2500.

In these examples, computer readable storage media 2524 is a physical or tangible storage device used to store program code 2518 rather than a medium that propagates or transmits program code 2518. Computer readable storage media 2524 is also referred to as a computer readable tangible storage device or a computer readable physical storage device. In other words, computer readable storage media 2524 is a media that can be touched by a person.

Alternatively, program code 2518 may be transferred to data processing system 2500 using computer readable signal media 2526. Computer readable signal media 2526 may be, for example, a propagated data signal containing program code 2518. For example, computer readable signal media 2526 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 2518 may be downloaded over a network to persistent storage 2508 from another device or data processing system through computer readable signal media 2526 for use within data processing system 2500. For instance, program code stored in a computer readable storage medium in a server data processing system may be downloaded over a network from the server to data processing system 2500. The data processing system providing program code 2518 may be a server computer, a client computer, or some other device capable of storing and transmitting program code 2518.

The different components illustrated for data processing system 2500 are not meant to provide architectural limitations to the manner in which different embodiments may be implemented. The different illustrative embodiments may be implemented in a data processing system including components in addition to and/or in place of those illustrated for data processing system 2500. Other components shown in FIG. 25 can be varied from the illustrative examples shown. The different embodiments may be implemented using any hardware device or system capable of running program code. As one example, data processing system 2500 may include organic components integrated with inorganic components and/or may be comprised entirely of organic components excluding a human being. For example, a storage device may be comprised of an organic semiconductor.

In another illustrative example, processor unit 2504 may take the form of a hardware unit that has circuits that are manufactured or configured for a particular use. This type of hardware may perform operations without needing program code to be loaded into a memory from a storage device to be configured to perform the operations.

For example, when processor unit 2504 takes the form of a hardware unit, processor unit 2504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 2518 may be omitted, because the processes for the different embodiments are implemented in a hardware unit.

In still another illustrative example, processor unit 2504 may be implemented using a combination of processors found in computers and hardware units. Processor unit 2504 may have a number of hardware units and a number of processors that are configured to run program code 2518. With this depicted example, some of the processes may be implemented in the number of hardware units, while other processes may be implemented in the number of processors.

In another example, a bus system may be used to implement communications fabric 2502 and may be comprised of one or more buses, such as a system bus or an input/output bus. Of course, the bus system may be implemented using any suitable type of architecture that provides for a transfer of data between different components or devices attached to the bus system.

Additionally, communications unit 2510 may include a number of devices that transmit data, receive data, or transmit and receive data. Communications unit 2510 may be, for example, a modem or a network adapter, two network adapters, or some combination thereof. Further, a memory may be, for example, memory 2506, or a cache, such as found in an interface and memory controller hub that may be present in communications fabric 2502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of illustrative embodiments is presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling a display on an aircraft, comprising:
    identifying, by a processor unit, while displaying on a touch screen a first format other than a format select page, an interaction with an edge area of the touch screen, such that the edge area extends along an edge of the touch screen; and
    displaying, in response to identifying the interaction, by the processor unit, a second format of the display on the touch screen, the second format of the display differing from the first format of the display and comprising the format select page, in response to the interaction the edge area extending along one of: a left edge, and a right edge, of the touch screen, such that the format select page comprises a plurality of buttons corresponding to a plurality of formats for the display.

2. The method of claim 1, further comprising the interaction with the edge area of the touch screen comprising one of: a touch in the edge area of the touch screen, and a slide action in the edge area of the touch screen.

3. The method of claim 1, further comprising the edge of the touch screen comprising a bottom edge of the touch screen.

4. The method of claim 1, wherein the edge area extends approximately one inch from the edge of the touch screen in a direction perpendicular to the edge of the touch screen.

5. The method of claim 1, wherein displaying the second format of the display on the touch screen comprises displaying the first format of the display on a first portion of the touch screen and simultaneously displaying the second format of the display on a second portion of the touch screen.

6. The method of claim 1 further comprising:
    displaying the first format of the display on another display device on the aircraft in response to identifying the interaction with the edge area of the touch screen, wherein the first format of the display comprises an engine-indicating and crew-alerting system display.

7. The method of claim 1 further comprising:
    displaying the first format of the display on another display device on the aircraft in response to identifying the interaction with the edge area of the touch screen, wherein the interaction with the edge area of the touch screen comprises a slide action in the edge area of the touch screen along a bottom edge of the touch screen.

8. The method of claim 1, wherein:
    the first format of the display comprises a partial format in which two formats are displayed simultaneously on the touch screen and the second format of the display comprises a full format in which only one of the two formats is displayed on the touch screen; and
    displaying the second format of the display comprises changing between displaying the partial format on the touch screen and displaying the full format on the touch screen in response to identifying a slide action in the edge area along a bottom edge of the touch screen.

9. An apparatus, comprising:
    a touch screen on a flight deck on an aircraft; and
    a controller configured such that in operation, based upon a first format displayed on the touch screen, the controller:
        identifies an interaction with an edge area of the touch screen, such that the edge area extends along one of a left edge and a right edge of the touch screen, and the first format comprises a format other than a format select page and the edge area extends along an edge of the touch screen; and displays, in response to identifying the interaction with the edge area of the touch screen, a second format of the display on the touch screen such that the second format of the display differs from the first format of the display and comprises the format select page for the display, such that the format select page comprises a plurality of buttons corresponding to a plurality of formats for the display.

10. The apparatus of claim 9, further comprising the interaction with the edge area of the touch screen comprising one of: a touch in the edge area of the touch screen, and a slide action in the edge area of the touch screen.

11. The apparatus of claim 9, wherein the edge of the touch screen further comprises a bottom edge of the touch screen.

12. The apparatus of claim 9, wherein the edge area extends approximately one inch from the edge of the touch screen in a direction perpendicular to the edge of the touch screen.

13. The apparatus of claim 9, wherein the controller is configured to display simultaneously the first format of the display on a first portion of the touch screen and the second format of the display on a second portion of the touch screen in response to identifying the interaction with the edge area of the touch screen.

14. The apparatus of claim 9, wherein:
the first format of the display comprises an engine-indicating and crew-alerting system display; and
the controller is configured to display the first format of the display on another display device on the aircraft in response to identifying the interaction with the edge area of the touch screen.

15. The apparatus of claim 9, wherein the controller is configured to display the first format of the display on another display device on the aircraft in response to identifying a slide action in the edge area along a bottom edge of the touch screen.

16. The apparatus of claim 9, wherein:
the first format of the display comprises a partial format in which two formats are displayed simultaneously on the touch screen and the second format of the display comprises a full format in which only one of the two formats is displayed on the touch screen; and
the controller is configured to change between displaying the partial format on the touch screen and displaying the full format on the touch screen in response to a slide action in the edge area along a bottom edge of the touch screen.

17. A method of controlling a display on an aircraft, comprising:
displaying, by a processor unit, a navigation display on a touch screen on the aircraft;
identifying, by the processor unit, an interaction with the navigation display displayed on the touch screen, the interaction comprising a slide action in a center area along a bottom edge of the navigation display, such that the center area is positioned at a horizontal center of the navigation display; and
changing, by the processor unit in response to the identifying the slide action, the navigation display via one of: displaying a vertical situation display, and ceasing displaying the vertical situation display.

18. The method of claim 17, wherein changing the navigation display comprises changing a range of the navigation display by an amount corresponding to a length of the slide action.

19. The method of claim 17, wherein:
the navigation display comprises a map display comprising a track line indicating a direction of travel of the aircraft;
identifying the interaction with the navigation display further comprises identifying a slide action along the track line in the map display; and
changing the navigation display further comprises changing a range of the navigation display in response to the slide action along the track line.

20. The method of claim 17, wherein:
the navigation display further comprises the vertical situation display comprising: distance markers indicating a distance from the aircraft, and a representation of an altitude of the aircraft with respect to the distance markers;
identifying the interaction with the navigation display further comprises identifying a slide action along the distance markers in the vertical situation display; and
changing the navigation display further comprises changing a range of the navigation display in response to the slide action along the distance markers.

21. The method of claim 17, wherein:
displaying the navigation display on the touch screen comprises displaying a range button in the navigation display on the touch screen;
identifying the interaction with the navigation display further comprises identifying a first interaction with the range button in the navigation display; and
changing the navigation display further comprises:
displaying a range menu in the navigation display on the touch screen in response to identifying the first interaction with the range button, the range menu comprising indications for a plurality of values for a range of the navigation display;
identifying a second interaction with the range menu; and
changing the range of the navigation display in response to the second interaction with the range menu.

22. An apparatus, comprising:
a touch screen on a flight deck on an aircraft; and
a controller configured such that in operation the controller:
displays a navigation display on the touch screen,
identifies an interaction with the navigation display displayed on the touch screen, such that the interaction comprises a slide action in a center area along a bottom edge of the navigation display, such that the center area is positioned at a horizontal center of the navigation display, and
changes the navigation display in response to the interaction with the navigation display, such that a change comprises one of: a display of a vertical situation display, and a cessation of the display of the vertical situation display.

23. The apparatus of claim 22,
further comprising the controller configured such that in operation, the controller changes a range of the navigation display by an amount corresponding to a length of the slide action.

24. The apparatus of claim 22, wherein:
the navigation display comprises a map display that comprises a track line that indicates a direction of travel of the aircraft; and
the controller further configured such that in operation the controller further identifies a slide action along the track line in the map display and changes a range of the navigation display in response to the slide action along the track line.

25. The apparatus of claim 22, wherein:

the navigation display further comprises the vertical situation display comprising distance markers that indicate a distance from the aircraft and a representation of altitude of the aircraft with respect to the distance markers; and the controller further configured such that in operation the controller further identifies a slide action along the distance markers in the vertical situation display and changes a range of the navigation display in response to the slide action along the distance markers.

26. The apparatus of claim 22, wherein the controller is further configured such that in operation the controller further:

displays a range button in the navigation display on the touch screen;

identifies a first interaction with the range button in the navigation display;

displays a range menu in the navigation display on the touch screen in response to identifying the first interaction with the range button, wherein the range menu comprises indications for a plurality of values for a range of the navigation display;

identifies a second interaction with the range menu; and changes the range of the navigation display in response to the second interaction with the range menu.

* * * * *